US006526055B1

(12) United States Patent
Perlman et al.

(10) Patent No.: US 6,526,055 B1
(45) Date of Patent: Feb. 25, 2003

(54) METHOD AND APPARATUS FOR LONGEST PREFIX ADDRESS LOOKUP

(75) Inventors: Radia J. Perlman, Acton, MA (US); Dah Ming Chiu, Acton, MA (US)

(73) Assignee: Sun Microsystems, Inc., Burlington, MA (US)

( * ) Notice: Subject to any disclaimer, the term of this patent is extended or adjusted under 35 U.S.C. 154(b) by 0 days.

(21) Appl. No.: 09/175,552

(22) Filed: Oct. 20, 1998

(51) Int. Cl.[7] .......................... H04L 12/28; G06F 12/08
(52) U.S. Cl. .................... 370/392; 370/395.32; 711/216
(58) Field of Search ................................. 370/389, 392, 370/396, 395.32, 395.52, 400–402; 714/216, 217, 219, 221; 707/3, 5, 6, 7, 100, 102

(56) References Cited

U.S. PATENT DOCUMENTS

| 5,983,223 | A | * | 11/1999 | Perlman ........................ 707/6 |
|---|---|---|---|---|
| 6,011,795 | A | * | 1/2000 | Varghese et al. ............. 370/392 |
| 6,018,524 | A | * | 1/2000 | Turner et al. ................ 370/392 |
| 6,052,683 | A | * | 4/2000 | Irwin ............................ 707/6 |
| 6,141,738 | A | * | 10/2000 | Munter et al. ............... 370/389 |
| 6,212,183 | B1 | * | 4/2001 | Wilford ....................... 370/392 |
| 6,223,172 | B1 | * | 4/2001 | Hunter et al. ................. 707/3 |
| 6,307,855 | B1 | * | 10/2001 | Hariguchi .................... 370/392 |

OTHER PUBLICATIONS

Comer, Douglas, XP–002066573, *Computing Surveys* "The Ubiquitous B–Tree", vol. 11, No. 2, Jun., 1979, pp.: 121–137.
Pei, Tong–Bi and Zukowski, Charles, XP000262202, *IEEE Network* "Putting Routing Tables in Silicon", New York, No. 1, Jan. 1992, pp.: 42–50.

Aho, A.V., et al. "Principles of Compiler Design." Addison–Wesley, Reading, US, XP–002140006, Chapter 3, Chapter 4, pp.: 73–125.
Publication: Wired, Article: "Lookups/Looking Up", Author: James Glave, CrucialTech, Dated: Apr. 1998, p.: 1.
Book: Addison–Wesley Professional Computing Series, Article: "Interconnections—Bridges and Routers", Author: Radia Perlman, Printed: Aug. 1997, IP Network Layer Addresses pp.: 152 –156 and Migrating Routing Algorithms pp.: 232 –239.
Publication: SIGCOMM '97, Article: "Scalable High Speed IP Routing Lookups", Author(s): Marcel Waldvogel and Bernhard Plattner of the Computer Engineering and Networks Laboratory, ETH Zürich, Switzerland, George Varghese and Jon Turner of the Computer and Communications Research Center, Washington University, St. Louis, Missouri, USA, pp.: 25 –36.

* cited by examiner

*Primary Examiner*—Steven Nguyen
(74) *Attorney, Agent, or Firm*—Squire, Sanders & Dempsey, L.L.P.

(57) ABSTRACT

A method and apparatus that constructs a "router database" and then uses the database to determine a longest match between a piece of target data, such as an address in a packet to be routed, and the database. The database contains a comparison table having a plurality of entries. In a first embodiment, each entry has up to k values, where $2<=k<=N$, where N is a number of comparison values in the database. In a second embodiment, each entry has up to k–1 values. During operation, various ones of the comparison table entries are loaded and compared to the address to determine a longest matching prefix in the router database. The comparison can be done in parallel.

42 Claims, 25 Drawing Sheets

Hardware-based Implementation With On-board Storage and k-1 Parallel Comparisons Creating Router Database and Routing a Received Packet Overview of Preparing a Router Database and
Routing a Received Packet Determine Data for a Particular Router Database Distribute Prefixes into Router Database

| Prefix | Port Information |
|---|---|
| 1 | Port 2 |
| 10 | Port 3 |
| 100 | Port 4 |
| 10010 | Port 5 |
| 101 | Port 6 |
| 110 | Port 7 |

Example Prefixes and their
Port Information

| | | Padded Prefix | Mask | Port Information |
|---|---|---|---|---|
| 552 | 1 | 000000 | 000000 | Port 1 |
| 560 | 2 | 100000 | 100000 | Port 2 |
| 562 | 3 | 100000 | 110000 | Port 3 |
| 564 | 4 | 100000 | 111000 | Port 4 |
| | 5 | 100100 | 111110 | Port 5 |
| | 6 | 100101 | 111000 | Port 4 |
| | 7 | 100111 | 110000 | Port 3 |
| 565 | 8 | 101000 | 111000 | Port 6 |
| 566 | 9 | 101111 | 110000 | Port 3 |
| 568 | 10 | 101111 | 100000 | Port 2 |
| | 11 | 110000 | 111000 | Port 7 |
| 569 | 12 | 110111 | 100000 | Port 2 |
| | 13 | 111111 | 000000 | Port 1 |

550 (table)

Rows 2–4: Duplicate Zero-Padded Prefixes
Rows 9–10: Duplicate One-Padded Prefixes Example Sorted Padded Prefixes and their Masks and Port Information

| | | Padded Prefix | Mask | Port Information |
|---|---|---|---|---|
| 552 → | 1 | 000000 | 000000 | Port 1 |
| 564 → | 2 | 100000 | 111000 | Port 4 |
| | 3 | 100100 | 111110 | Port 5 |
| | 4 | 100101 | 111000 | Port 4 |
| | 5 | 100111 | 110000 | Port 3 |
| 565 → | 6 | 101000 | 111000 | Port 6 |
| 568 → | 7 | 101111 | 100000 | Port 2 |
| | 8 | 110000 | 111000 | Port 7 |
| | 9 | 110111 | 100000 | Port 2 |
| | 10 | 111111 | 000000 | Port 1 |

Example Sorted Padded Prefixes and
their Masks and Port Information with
Duplicates Removed
(N=10)

FIG. 5(c)

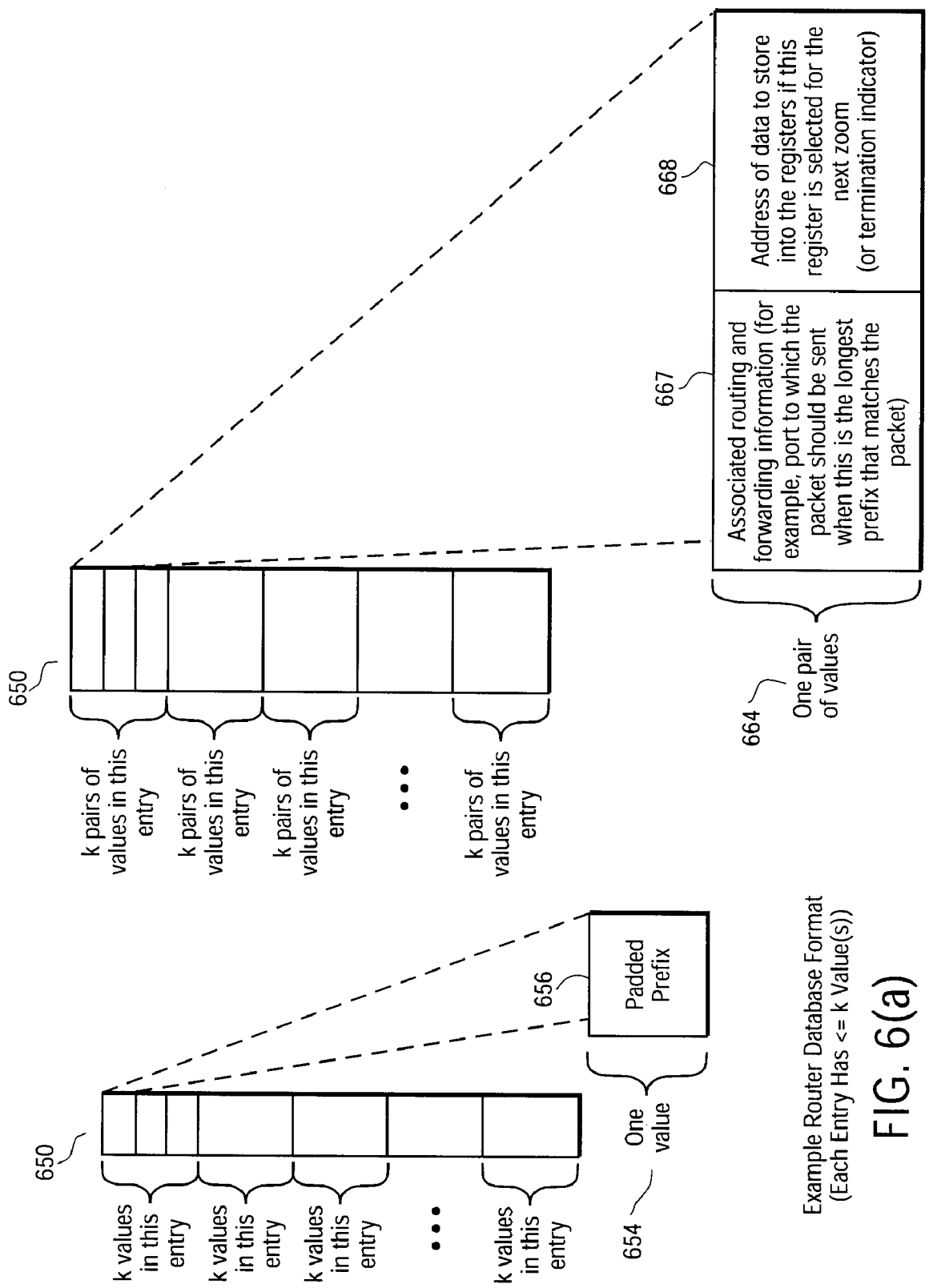

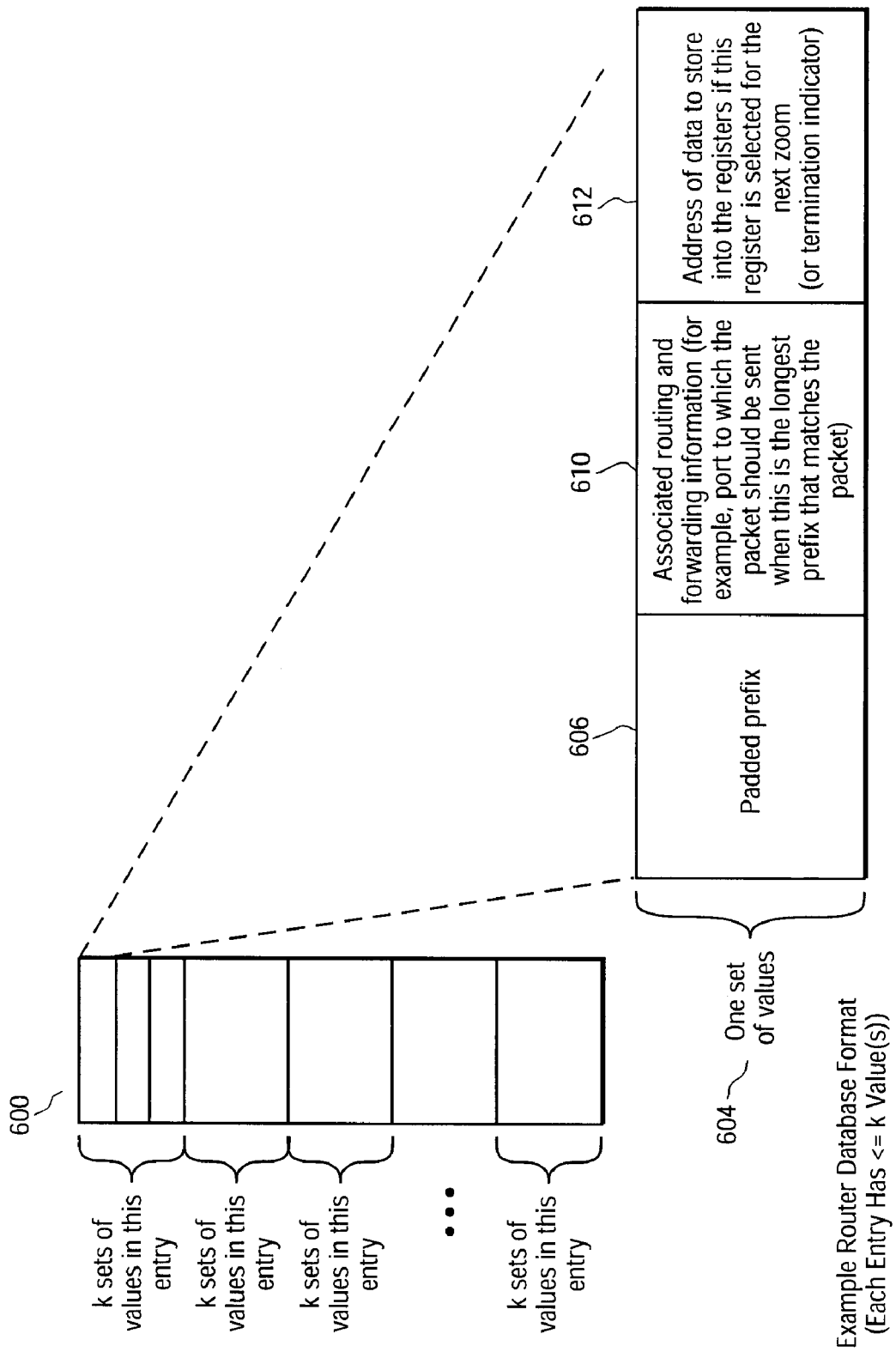
FIG. 6(b) Example Router Database Format (Each Entry Has <= k Value(s))

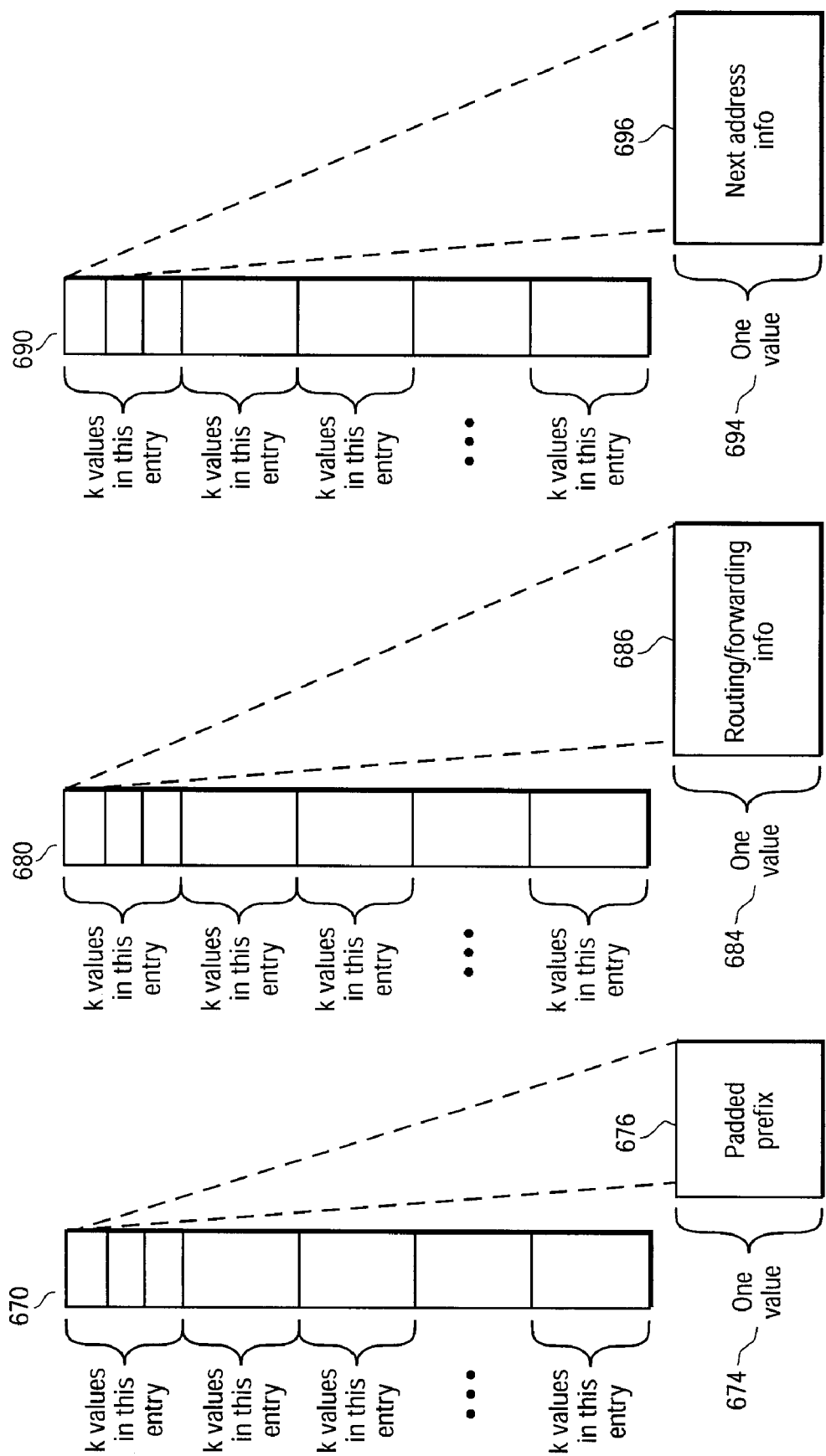
FIG. 6(C)   Example Router Database Format
(Each Entry Has <= k Value(s))

Example of a Router Database,
N = Number of Padded Prefixes = 10
k = Number of Values in Each Entry = 3

Route a Received Packet
in Accordance With Its
Destination Address

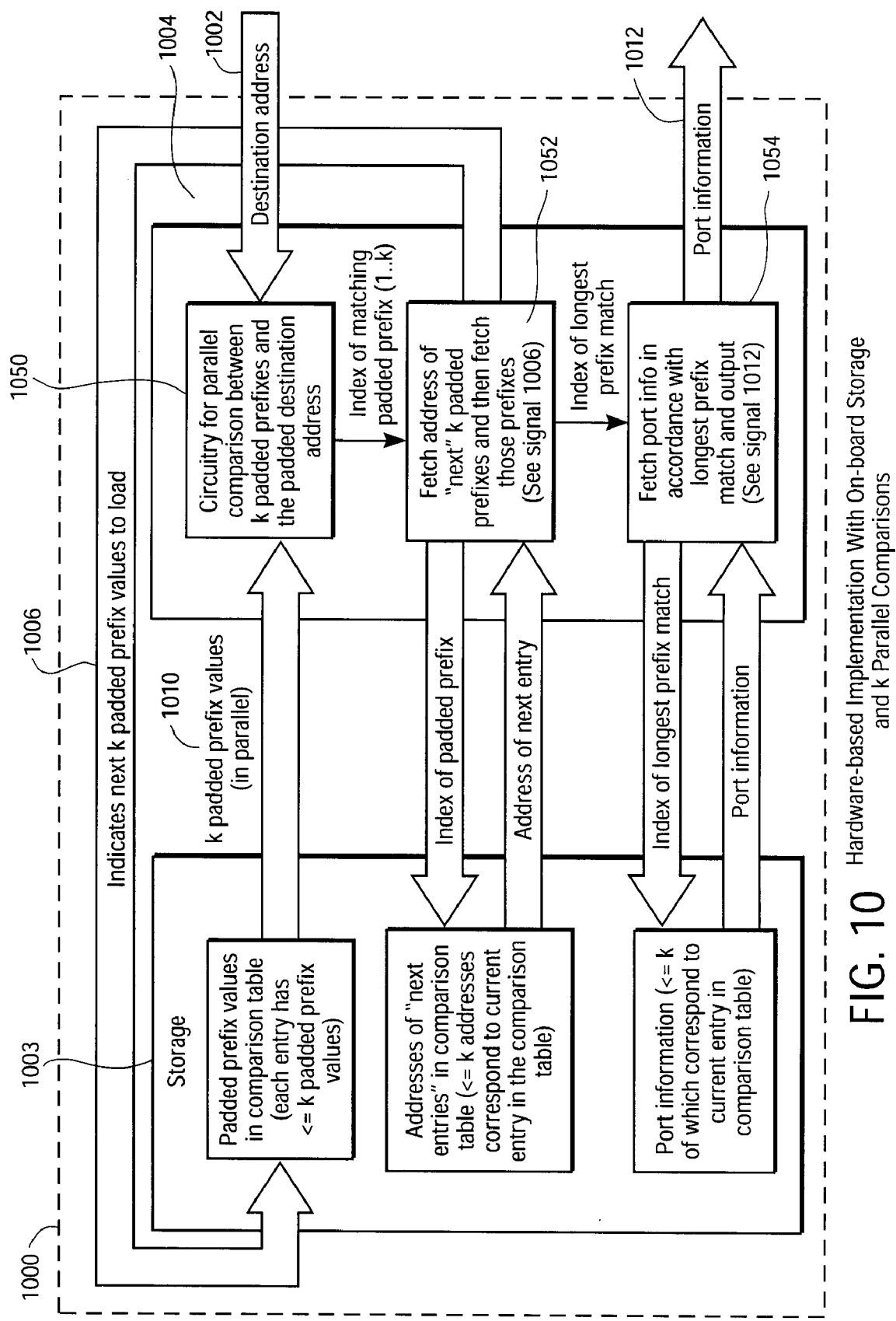
FIG. 10  Hardware-based Implementation With On-board Storage and k Parallel Comparisons

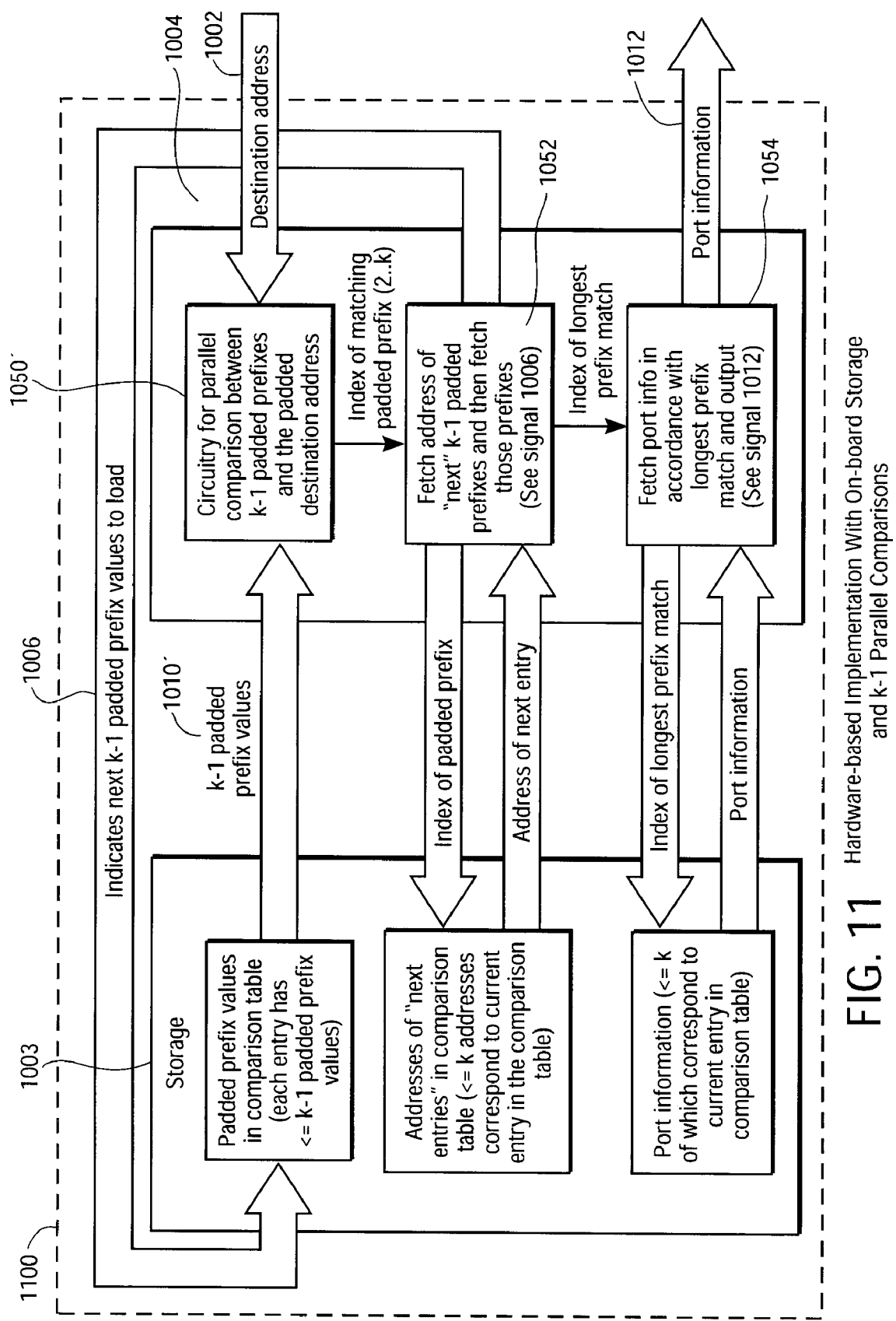
FIG. 11 Hardware-based Implementation With On-board Storage and k-1 Parallel Comparisons

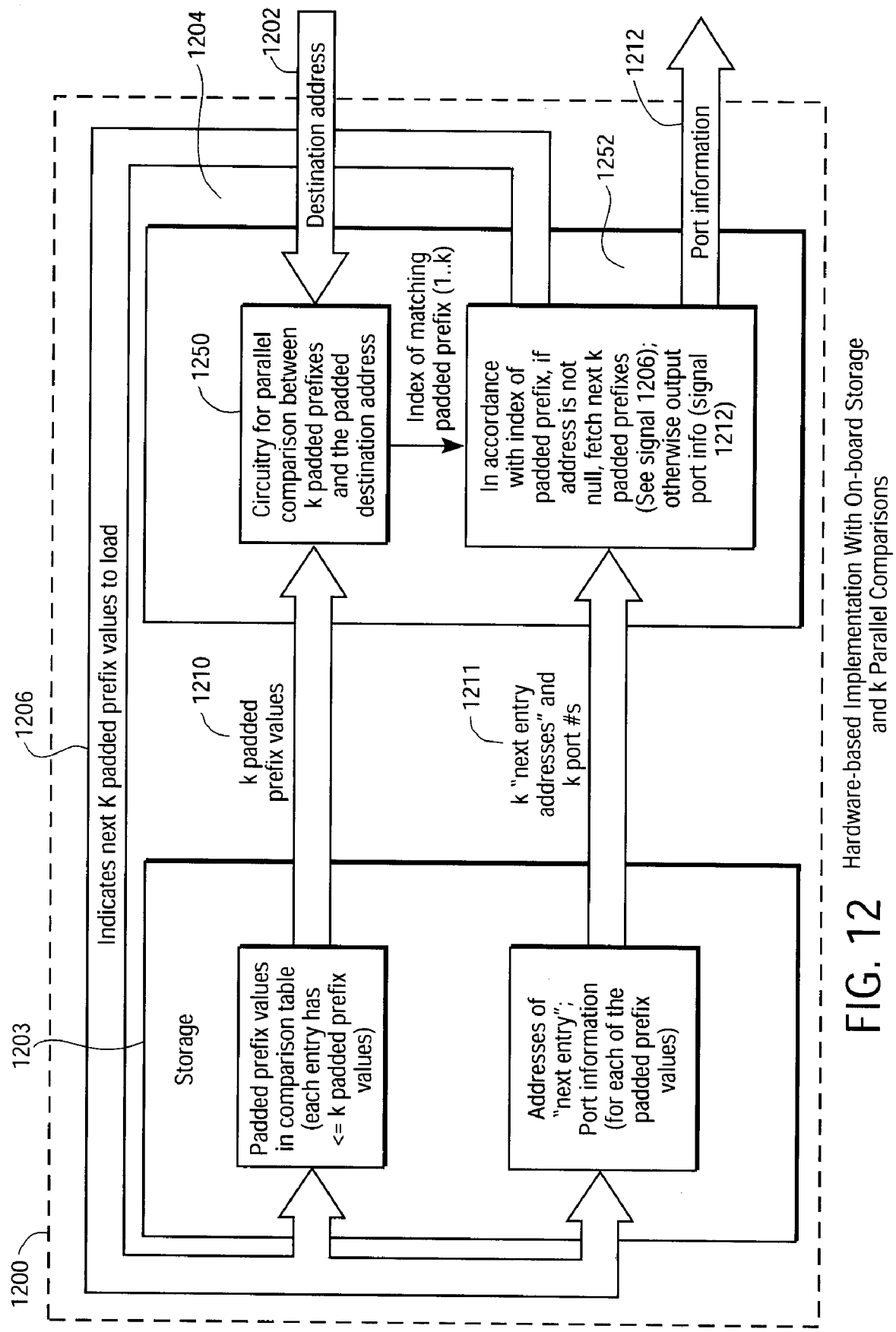
FIG. 12  Hardware-based Implementation With On-board Storage and k Parallel Comparisons

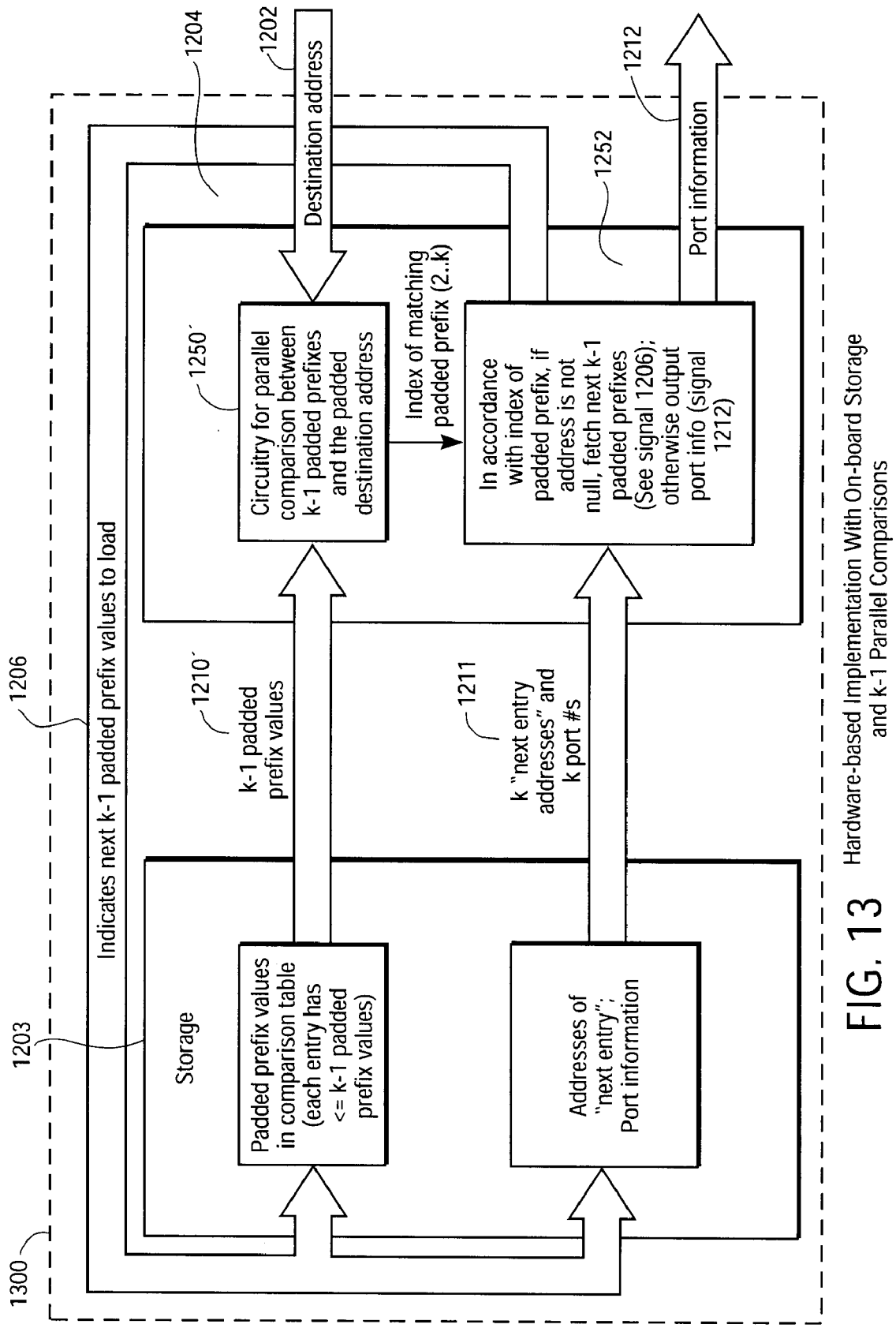
FIG. 13  Hardware-based Implementation With On-board Storage and k-1 Parallel Comparisons

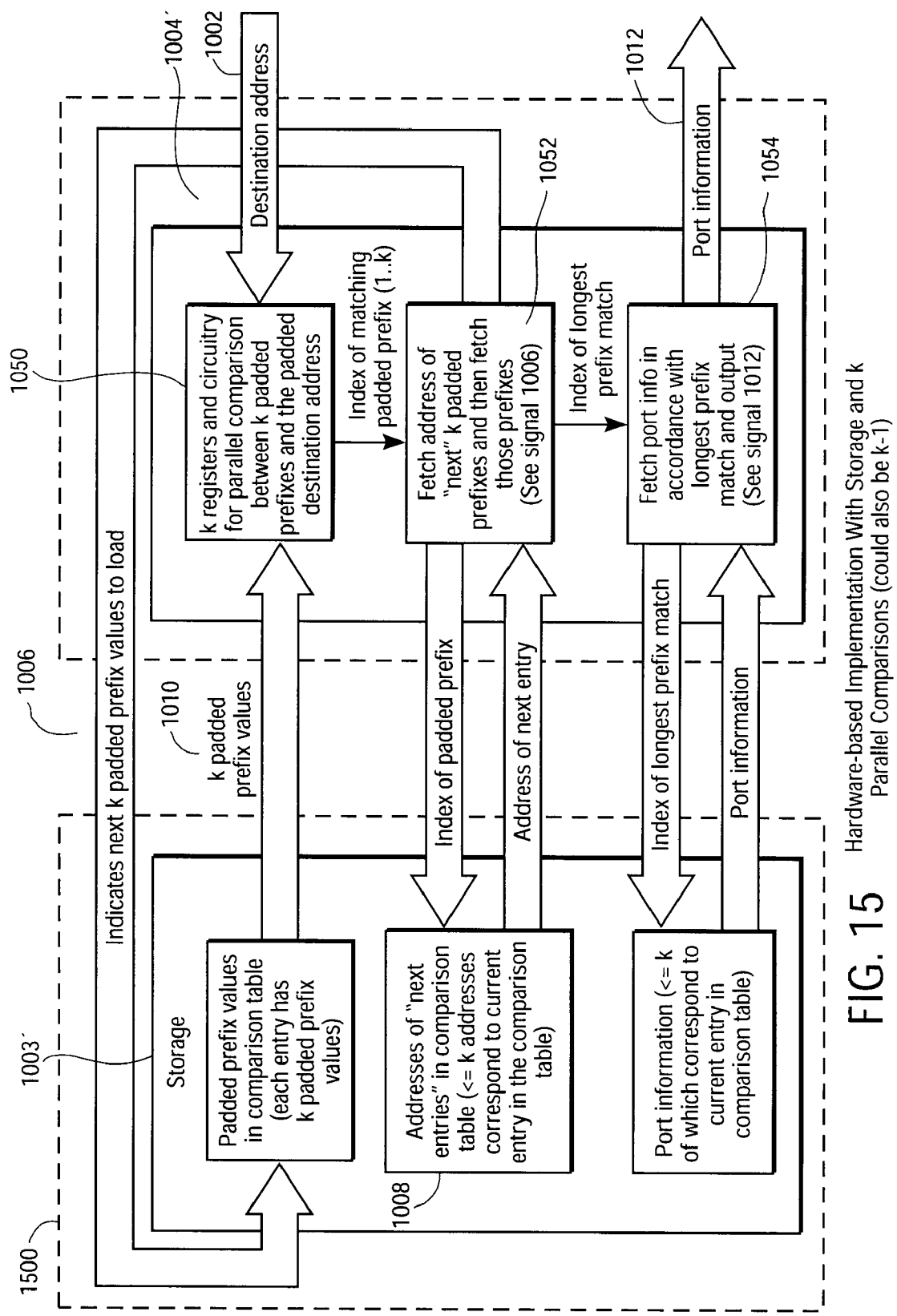
FIG. 15  Hardware-based Implementation With Storage and k Parallel Comparisons (could also be k-1)

METHOD AND APPARATUS FOR LONGEST PREFIX ADDRESS LOOKUP

BACKGROUND OF THE INVENTION

The present invention relates generally to network packet routing and, specifically, to a method and apparatus for routing packets in a network in accordance with a longest prefix match of the destination address of the packet.

In many network systems, information transmitted through the network is organized in "packets." Each packet is transmitted by a sender node and routed from node to node in the network until it reaches a destination node specified in the packet. Each node that receives a packet must be able to decide which node should next receive that packet. This determination is generally done using a "forwarding table" in the node. The node looks at the destination address of each individual packet and routes the packet to another node in accordance with the routing table and the packet's destination address. This process is repeated in successive nodes until the packet reaches its destination.

In conventional networks, each node contains a forwarding table that maps an address prefix of a destination address in received packets to respective ports in the network. Routers, switches, ISs (Intermediate Systems), IMPs (Interface Message Processors), gateways and other similar elements also contain forwarding tables, and the term "router" is used herein to refer to any node that routes or forwards received packets. If a received packet's destination address has length W, the prefixes in the forwarding table may have lengths anywhere in the range 0 to W inclusive. For example, if a forwarding table contains routing information for prefixes of 1, 10, 100, 10010, and 111, a destination address of 10111 in a received packet has a longest prefix match of 10, since 10 is the longest prefix in the forwarding table that completely matches the destination address. When a packet arrives at a router, the router finds the longest prefix match in the router's forwarding table and forwards the received packet accordingly. A longest matching prefix in the forwarding table needs to be found in a timely manner, since packets generally are routed in real-time and a router's performance is based on how quickly it can forward a packet.

As an example, two conventional methods for performing address lookup in forwarding tables are binary search and TRIE (each of which is documented in Perlman, "Interconnection: Bridges and Routers," pp 233–239, published by Addison Wesley 1992). Neither of these methods provide an ideal solution to the problem of finding a longest prefix match. Straightforward binary search, for example, does not work for address prefix lookups because the address prefixes can have different lengths. Therefore, a destination address may not match the prefixes in accordance with their alphabetized order. In the example above, if a forwarding table contains prefixes in alphabetized order of 1, 10, 100, 10010, and 111, an address of 10111 in a received packet will match the forwarding table prefix 10, even though it would be alphabetized after the prefix 10010. Because the forwarding table can have prefixes of varying lengths, finding a longest matching prefix in a forwarding table that matches a received destination address in as short a time as possible can be problematic. Similarly, while the TRIE method works correctly as a forwarding method, it lacks efficiency in routers where extremely high speeds are a requirement.

SUMMARY OF THE INVENTION

Various embodiments of the present invention can be implemented in hardware, software, or some combination of the two. In the described embodiments of the present invention, a node receives a packet that contains a destination address. The node then checks a router database to determine a longest prefix match for the destination address and further determines a port associated with the longest prefix match in the router database. The router database contains comparison values based on forwarding information specific to the router. A method in accordance with the present invention involves two parts: a first part looks at the routing information associated with a particular router and determines the data in the router database for that router. A second part searches the router database whenever a packet is received to determine a longest prefix match for a destination address in the received packet. The received packet is then routed to the port associated with the longest prefix match.

It is an important aspect of the present invention that a node routes a received packet in as little time as possible. Thus, while creation of the router database itself is not particularly time-critical, the actual process of searching the router database must be done very quickly. In the described embodiments of the present invention, a quick search is possible partly because of the way the router database is organized and partly because the search can involve parallel comparisons and/or parallel loads. In certain embodiments, the increase in speed is also due to specialized hardware/software used to search the router database.

Specifically, the described embodiments of the present invention allows lookup of a particular destination address prefix of size 0 through W to be performed in $O(\log_k N)$, where N is the number of "padded prefixes" in the router database. In the described embodiments, the routing information for each node includes several prefix/port pairs, which are used to determine the content of the router database for the node. In general, there are twice as many "padded prefixes" in the router database as there are prefixes in the router's forwarding information (there may sometimes be fewer than twice as many padded prefixes, as described below in detail in connection with various embodiments of the invention).

Specifically, the router database is organized into a comparison table having a number of "entries." Each "entry" contains up to k−1 values (or k values, in other embodiments). As used herein, "k" is the number of parallel elements required to compare the values in one entry in a router database to a received address (when the invention is implemented in hardware). Each of the values in a comparison table entry contains a "padded prefix." A corresponding table includes a pointer to a "next entry" of data in the comparison table and may include additional information, such as port information. When a destination address in a packet is first received by a router, the values of a first one of the entries in the router database are loaded into the router to determine a port corresponding to the received destination address. As mentioned above, each entry in the comparison table has up to k−1 (or k) values.

Certain embodiments of the invention allow the k−1 (or k) values in a router database entry to be compared to the destination address in parallel. While the described embodiment can also be implemented on a general purpose computer, or on a computer having multiple processors, at least one embodiment of the present invention is implemented using hardware allowing very fast, parallel comparison of the values in a router database entry against the received destination address. For example, a described hardware implementation uses k comparisons. Another described hardware implementation uses k−1 comparisons. A described software implementation uses k−1 comparisons.

The comparison of the values in a first entry of the router database against the destination address identifies a next entry in the comparison database, which is, in turn, loaded and compared to the destination address. This process of loading a "next entry" from the comparison table and performing fast k-ary compares against the destination address is repeated until there are no more "next entries" in the database. At this point, a longest prefix match has been found and the packet is routed to a port associated with the longest prefix match in the router database.

In at least one described embodiment, creation of the router database proceed as follows. (Each router has associated routing information comprising 2 pairs.) First, the prefixes are padded with ones and with zeroes to a length of the maximum address length +1. Next a mask is associated with each zero-padded prefix and an all-zero padded 2 pair is added if one does not already exist. The padded 2 pairs are then sorted and a "smaller mask" is determined for each one-padded prefix. The smaller mask allows the described embodiments of the present invention to find closest matches, as described below in detail. Next, duplicate padded 2 pairs are removed, leaving "N" padded prefix router pairs. Finally, the sorted padded 2 pairs are distributed into "entries" having up to k–1 (or k) padded 2 pairs in each entry.

In accordance with the purpose of the invention, as embodied and broadly described herein, the invention relates to a method of finding a longest match for a piece of target data against a group of comparison values, comprising the steps, performed by a data processing system of accessing at least one of a plurality of entries in a comparison data structure, each entry in the data structure having at most k–1 comparison values and k addresses of a next data structure entry, where 2<=k<=N, and where N is the total number of comparison values; and comparing k–1 comparison values in the at least one of the data structure entries to the target data, in parallel, to determine a longest matching value.

In further accordance with the purpose of the invention, as embodied and broadly described herein, the invention relates to an apparatus that finds a longest match for a piece of target data against a group of comparison values, comprising: a portion configured to access at least one of a plurality of entries in a comparison data structure, each entry in the data structure having at most k–1 comparison values and k addresses of a next data structure entry, where 2<=k<=N, and where N is the total number of comparison values; and a portion configured to compare k–1 comparison values in the at least one of the data structure entries to the target data, in parallel, to determine a longest matching value.

In further accordance with the purpose of the invention, as embodied and broadly described herein, the invention relates to a method of finding a longest match for a piece of target data against a group of comparison values, comprising the steps, performed by a data processing system of: accessing at least one of a plurality of entries in a comparison data structure, each entry in the data structure having at most k comparison values and k addresses of a next data structure entry, where 2<=k<=N, and where N is the total number of comparison values; and comparing k comparison values in the at least one of the data structure entries to the target data, in parallel, to determine a longest matching value.

In further accordance with the purpose of the invention, as embodied and broadly described herein, the invention relates to an apparatus that finds a longest match for a piece of target data against a group of comparison values, comprising: a portion configured to access at least one of a plurality of entries in a comparison data structure, each entry in the data structure having at most k comparison values and k addresses of a next data structure entry, where 2<=k<=N, and where N is the total number of comparison values; and a portion configured to compare k comparison values in the at least one of the data structure entries to the target data, in parallel, to determine a longest matching value.

In further accordance with the purpose of the invention, as embodied and broadly described herein, the invention relates to a method of determining contents of a router database used to find a longest matching prefix for an address in a packet received by a router, comprising the steps of: creating a one-padded prefix and a zero-padded prefix for each of a plurality of prefixes for which the router has an associated port; associating a mask with each zero-padded prefix; sorting the padded prefixes, keeping each padded prefix paired with its associated mask; for each one-padded prefix, changing its mask to a "smaller" mask by performing a loop through the padded prefixes having a lower sorted order than the one-padded prefix; and removing all duplicate padded prefixes, leaving a padded prefix with a highest sorted order mask if the prefix is zero-padded; and leaving a padded prefix with a lowest sorted order mask if the prefix is one-padded.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1(*b*) is a block diagram showing the creation of a router database and use of the router database by the router to route received packets.

FIG. 4(*b*) is a flow chart showing further steps to determine values in the router database.

FIG. 4(*c*) is a flow chart showing steps to apportion the sorted padded prefixes into memory entries in the router database.

FIG. 5(*b*) is an example of sorted padded prefixes and their associated masks and ports.

FIG. 5(*c*) is an example of sorted padded prefixes and their associated masks and ports after duplicate padded prefixes have been removed.

FIG. 10 is a block diagram of an embodiment of the present invention implemented in hardware.

FIG. 11 is a block diagram of another embodiment of the present invention implemented in hardware.

FIG. 12 is a block diagram of another embodiment of the present invention implemented in hardware.

FIG. 13 is a block diagram of another embodiment of the present invention implemented in hardware.

FIG. 15 is a block diagram of another embodiment of the present invention implemented in hardware.

DETAILED DESCRIPTION OF PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

I. General discussion

Figure 1A:
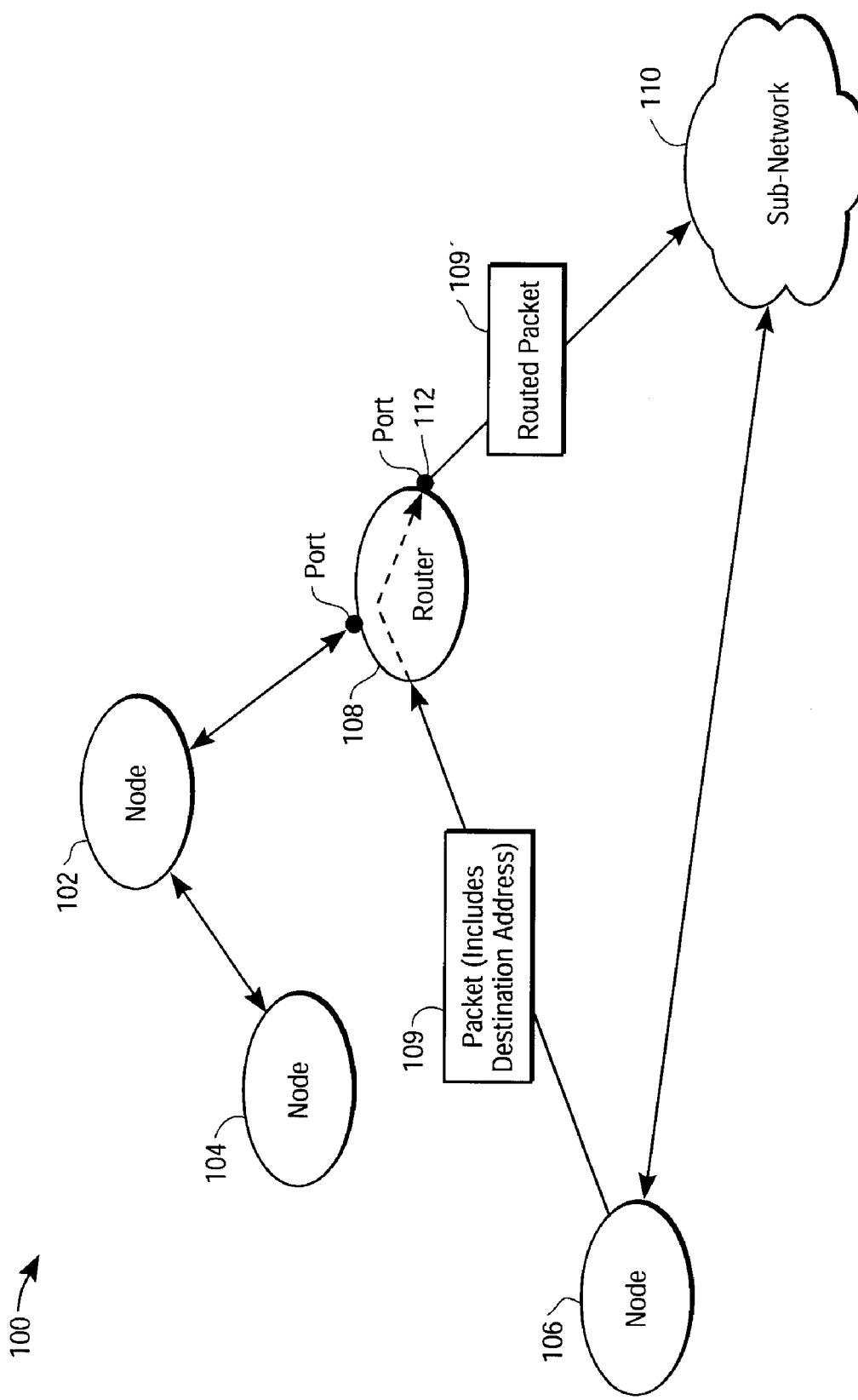
FIG. 1(*a*) is a block diagram of a network including at least one router.

FIG. 1(a) is a block diagram of a network 100 including at least one router 108. Nodes 102, 104, and 106 and sub-network 110 send or route packets (or similar types of data) within network 100. Some of these packets pass through router 108. In the described embodiment of the present invention, router 108 looks at a destination address in each received packet 109 and routes the received packet to an appropriate one of the router's ports 112 in accordance with the destination address. It will be understood that, although the following description discusses a router, the present invention can be used in any type of element that needs to find the longest prefix match. Thus, the present invention need not be limited to routers per se and can be used in any appropriate system.

Figure 1B:
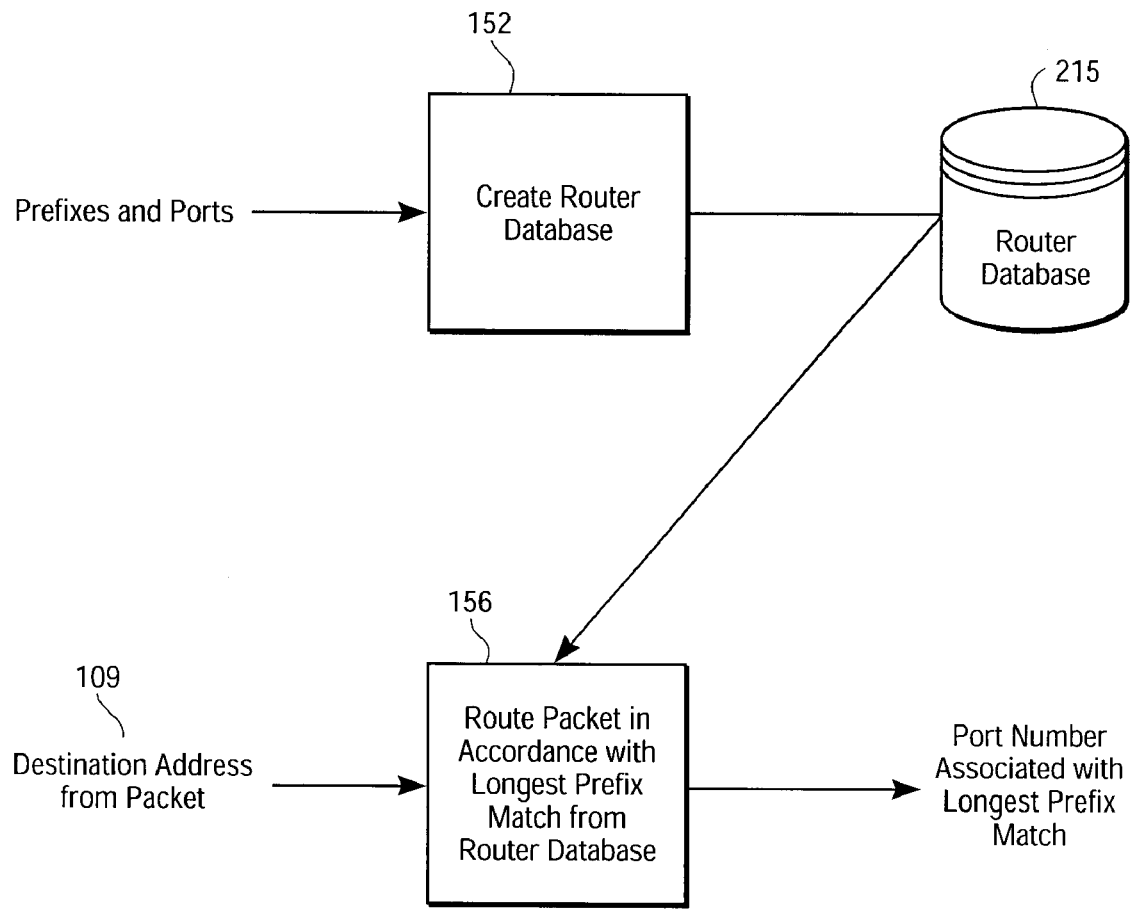

FIG. 1(b) is a block diagram showing the creation of a router database 215 and use of the router database 215 by the router to route received packets. As shown in the Figure, a list of address prefixes and ports for the specific router is initially used to create 152 router database 215. After creation of router database 215, whenever a packet is received by the router, the router determines a longest prefix match in the router database for the destination address of the packet. The longest prefix match has an associated port. The received packet is routed 156 to the associated port by the router.

Figure 2:
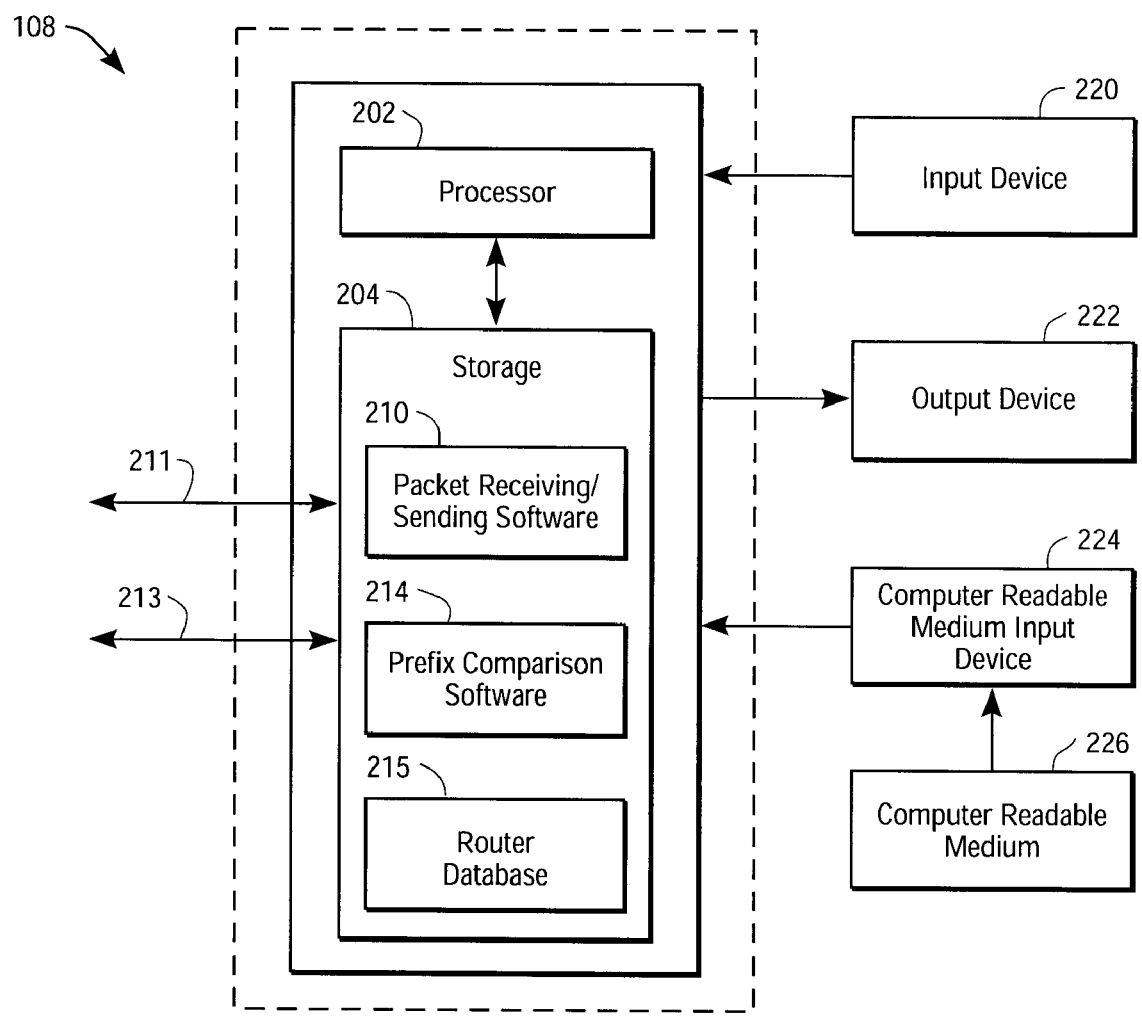
FIG. 2 is a block diagram of a first example of the router of FIG. 1 when the invention is implemented in software on a system having a single processor.

FIG. 2 is an example of a block diagram of router 108 of FIG. 1 when the invention is implemented in software. Router 108 includes processor 202 and storage area (such as a memory) 204. Storage area 204 includes packet receiving/sending software 210, which can receive and send packets (or similar data) over one of connections 211, 213 (which correspond to respective ports) using any appropriate protocol or method, including, but not limited to the TCP/IP protocol, the ISO CLNP (connectionless network protocol), or the ARPANET protocol. The value k (where 2<=k<=N) represents a number of values in a "entry" in router database 215, as is discussed below. N is the number of distinct padded prefixes that can be matched, as discussed below. In embodiments that perform comparisons in parallel, k is also the number of comparisons performed in parallel. Storage 204 also includes prefix comparison software, which determines a port to which a received packet 109 is to be routed, and a router database 215, as described below.

In certain embodiments, router 108 includes a computer readable medium input device 224, which is capable of reading a computer readable medium 226. A person of ordinary skill in the art will understand that the system of FIG. 2 may also contain additional elements, such as input/output lines; additional input devices and additional display devices. The system of FIG. 2 also may include application programs, operating systems, data, etc., which are not shown in the figure for the sake of clarity. It also will be understood that the system of FIG. 2 can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed below preferably are performed by processor 202 (or other appropriate processor or processors) executing instructions stored in storage areas 204 (or other appropriate storage areas). Specifically, the steps of the embodiment described herein are performed by prefix comparison software 214. It will also be understood that the invention is not limited to any particular implementation or programming technique and that the invention may be implemented using any appropriate techniques for implementing the functionality described herein. The invention is not limited to any particular programming language, operating system, or network protocol.

Some or all of the instructions and data structures in storage areas 204 may be read into memory from computer-readable media 226. Execution of sequences of instructions contained in the storage areas causes processor 202 to perform the process steps described herein.

In alternative embodiments, hard-wired circuitry may be used in place of or in combination with software instructions to implement the invention. Thus, preferred embodiments of the invention are not limited to any specific combination of hardware circuitry and software.

The instructions performed by the processor can also be transmitted over a carrier wave in a computer network such as the internet, an intranet, a LAN, a WAN, and so on.

II. Setting up the Router Database

Figure 3:
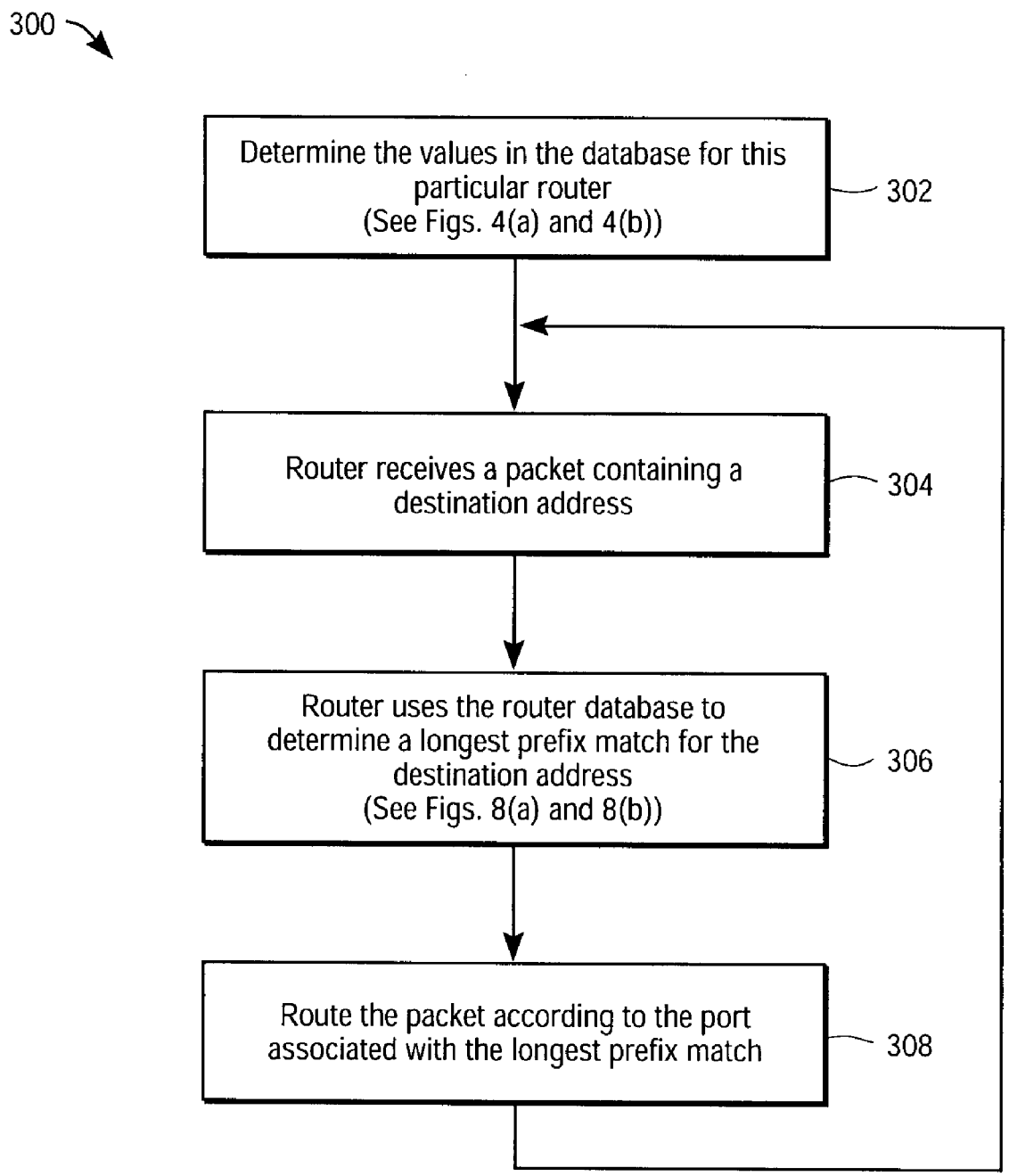
FIG. 3 is a flow chart showing an overview of steps involved in setting up and using the router database.
Figure 4A:
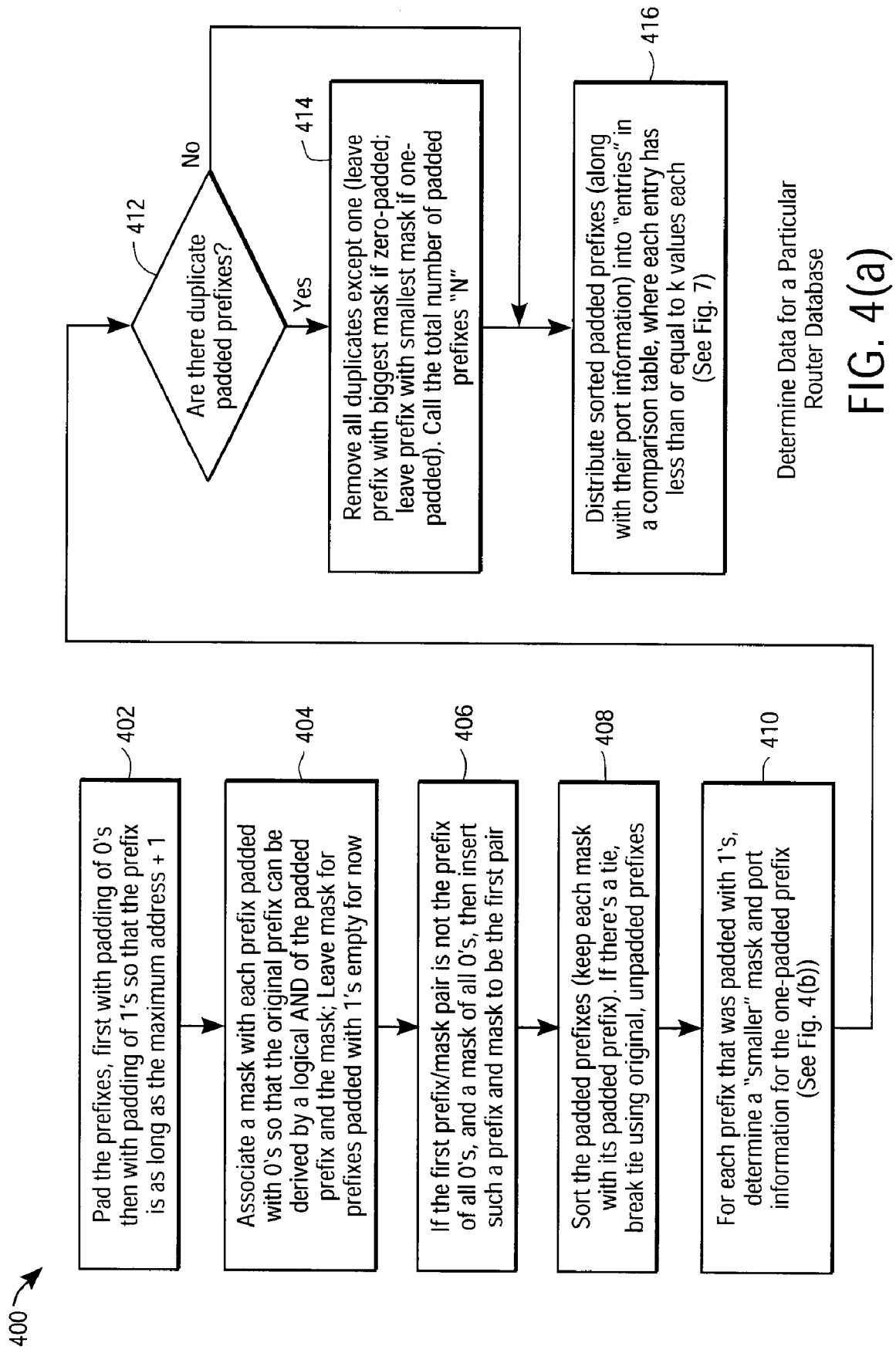
FIG. 4(*a*) is a flow chart showing steps performed to determine values to be placed in the router database.
Figure 4B:
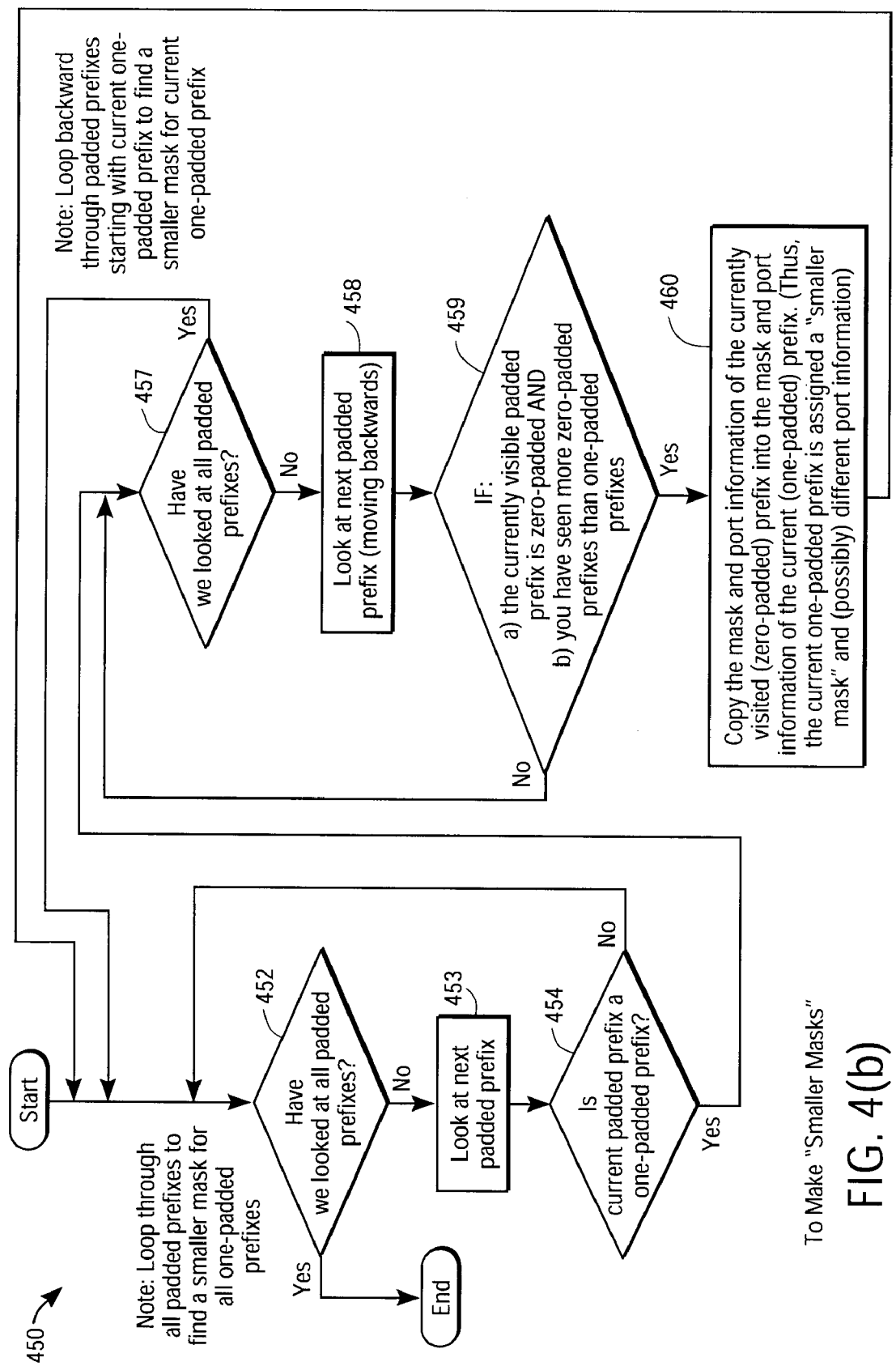
Figure 4C:
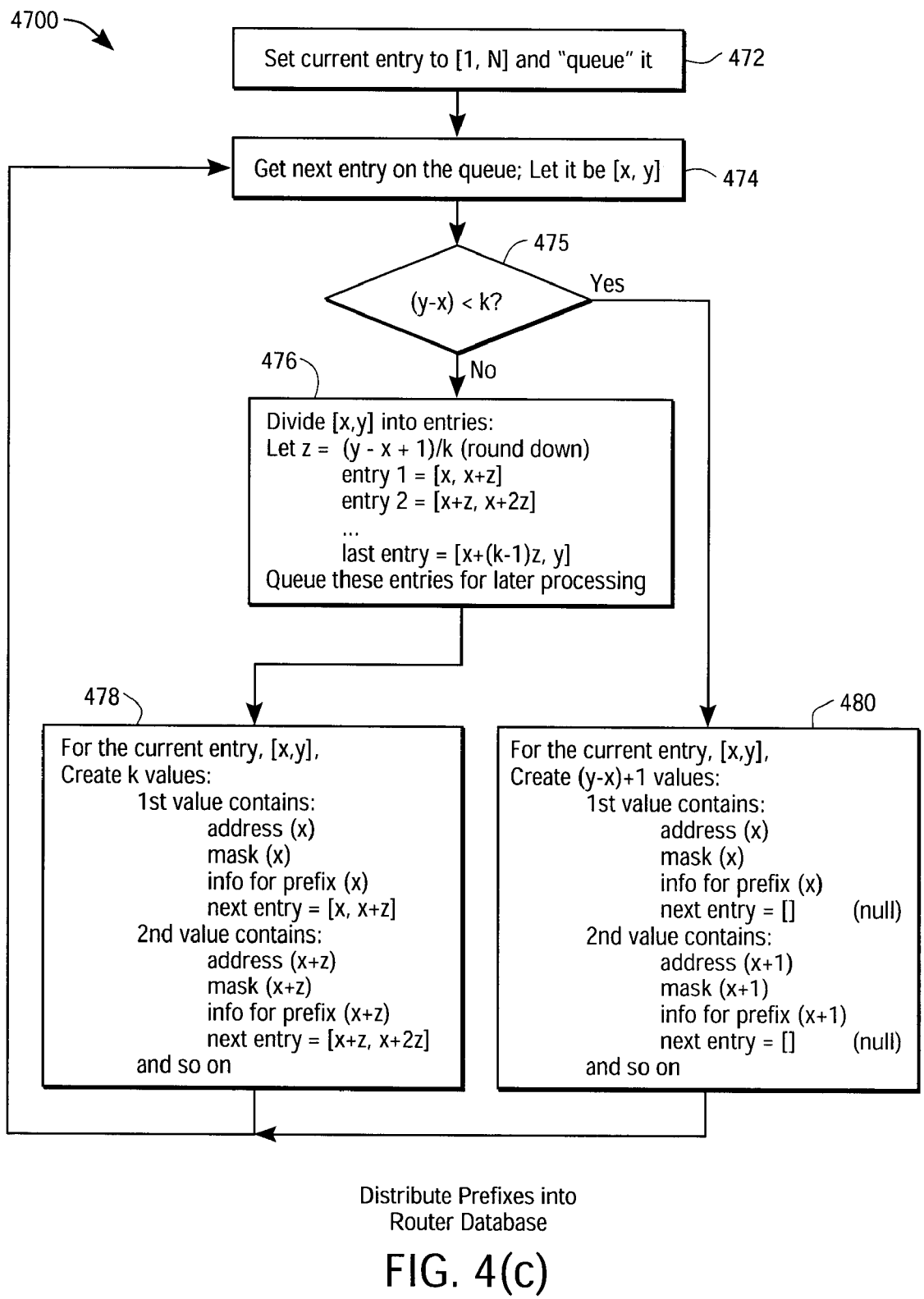

In the following discussion, FIG. 3 provides an overview of the use of the described embodiment and FIGS. 4–7 relate to setting up router database 215 for a particular router 108. The contents of the router database 215 of each router 108 needs to be determined individually, since the values in the router databases of each router are not necessarily the same. FIG. 3 shows an overview of the process of the present invention. First, the information in router database 215 is determined in step 302. Details of this determination are shown in FIGS. 4(a) through 4(c), which are preferably performed as preprocessing steps, once for each router 108. When the router receives a packet (step 304), the router uses the router database to determine a longest prefix match in the router database for the destination address (step 306).

Details of steps 304 through 308 are shown in FIGS. 8(*a*) and 8(*b*), which relate to use of router database 215 to perform a comparison with a received destination address.

The discussion of FIGS. 4–7 below will be performed with reference to the exemplary prefixes of FIGS. 5(*a*)–5(*c*). FIG. 5(*a*) shows an example 500 of non-padded prefixes and their associated port information for a particular router. FIG. 5(*b*) shows an example 550 of sorted padded prefixes and their associated masks and port information. FIG. 5(*c*) shows an example 580 of sorted padded prefixes and their associated masks and ports after duplicate prefixes have been removed. Although the example described herein uses destination addresses of five digits, it should be understood that the present invention is not limited to addresses or data values of this length and that the present invention can be used with addresses or data values of any appropriate length.

As shown in FIG. 5(*a*), exemplary router 108 routes packets having destination addresses matching the following prefixes: 1, 10, 100, 10010, 101, and 110. As further shown in FIG. 5(*a*), received packets having destination addresses that best match these prefixes are sent, respectively to ports 2, 3, 4, 5, 6, and 7. The described embodiment of the present invention assumes that the protocol implemented by router 108 prohibits the use of non-contiguous masks. A contiguous mask has the property that no 1 bit appears to the right of any 0 bit in the mask.

The steps of FIGS. 4(*a*)–4(*c*), which determine contents of router database 215 are described below in connection with the example prefixes of FIGS. 5(*a*)–5(*c*). In step 402 of FIG. 4(*a*), the prefixes to be placed in router 108 are padded to the maximum address length plus one (e.g., to six digits) with 0's, then with 1's, so that each prefix yields two padded prefixes that are as long as the maximum address plus one.

In the following discussion, the portion of a padded prefix attributable to the non-padded prefix is shown in bold type. Thus, the zero-padded prefix for a prefix of "1" is represented as 100000, indicating an original prefix of one digit and five digits of zero-padding. Similarly, the zero-padded prefix for a prefix of "100" is represented as 100000, indicating an original prefix of three digits and three digits of zero-padding. Use of bold type herein is merely used as an aid to understanding the described embodiments of the invention. In the described embodiments, the padded prefixes 100000 and 100000, for example, are represented in the same way in memory 204.

In FIG. 5(*a*), the prefix "1" is padded to 100000 and to 111111. In step 404, a mask is associated with each padded zero-prefix so that the original prefix can be derived by a logical AND of the zero-padded prefix and the mask. For example, the padded prefix 101000 565 (FIG. 5(*b*)) is assigned a mask of 111000 (101000 AND 111000=101000). Masks for the one-padded prefixes will be determined in step 410.

In step 406, if the first prefix/mask pair is not all 0's, then such an all 0 prefix and mask are inserted (see, for example, element 552 of FIG. 5(*b*)). It is also possible that an all zero value is already present in the padded prefixes. The all zero prefix matches everything, and is sometimes in the database as a default route and, when not initially in the database, can be added as a simple way of handling the case when no match is found.

In step 408, the padded prefixes are sorted (keeping each mask and port with its associated padded prefix). If two padded prefixes have the same value, the tie is broken using the original prefix values. During tie-breaking, for zero-padded prefixes, the padded prefix having the smaller original prefix is ranked lower. Thus, 100000 560 precedes 100000 562. For one-padded prefixes, the padded prefix having the larger original prefix is ranked lower. Thus, 1011111 566 precedes 101111 568.

In step 410, a "smaller mask" is determined for each prefix that was padded with 1's, as further explained in FIG. 4(*b*). Step 410 may also change the port information of the one-padded prefix. The one-padded prefixes and their smaller masks are used in the present invention to determine a longest (closest) match when no exact match exists between a prefix and a received destination address. A smaller mask is similar to the mask used for the zero-padded prefixes, except that one or more of the rightmost Is in the mask of the zero-padded prefix is changed to a "0". This has the result that the smaller mask of a one-padded prefix is the same mask as a mask of a shorter zero-padded prefix in the router. Thus, for example, the zero-padded prefix 101000 565 has an associated mask 111000, while the one-padded prefix 101111 566 has an associated mask 110000 (which is the same as the mask of the zero-padded prefix 100000 562). In addition, the one-padded prefix 101111 566 has the same associated port information as the zero-padded prefix 100000 562 (i.e., both prefixes 100000 562 and prefix 101111 566 corresponds to port 3). If the mask for zero-padded prefix 101000 565 (i.e., 111000) is applied to its prefix, it yields 101000, while if the mask for one-padded prefix 101111 566 (i.e., 110000) is applied to its prefix, it yields 100000.

With reference to FIG. 5(*b*), a determination that a destination address fits between padded prefix 110111 and padded prefix 111111 tells us that the longest matching padded prefix is 100000 and the associated port for the destination address is port 2. We know this because application of the mask of 110111 (i.e., 100000) to 110111 yields "100000" and padded prefix 110111 is associated with port 2. In FIG. 5(*b*) it is assumed that W (the length of the received packet's destination address) is equal to "5".

In steps 412 and 414, duplicate padded prefixes are removed. If duplicates exist, a zero-padded duplicate prefix with the longest mask is kept, and a one-padded duplicate prefix with the shortest mask is kept. Thus, zero-padded values 560 and 562 in FIG. 5(*b*) are removed, leaving value 564 (which has a longest mask of the zero-padded duplicates). Similarly, one-padded value 566 is removed, leaving value 568 (which has a shortest mask of the one-padded duplicates). The total number of padded prefix/mask pairs is designated "N". In the example of FIG. 5(*c*), N=10.

In step 416, the sorted padded prefixes are distributed into "entries" in router database 215. Each entry has at most k values. This distribution step is described in more detail in connection with FIGS. 4(*c*) and 7.

FIG. 4(*b*) shows more detail of step 410 of FIG. 4(*a*), which determines the smaller masks for one-padded prefixes. FIG. 4(*b*) loops through the sorted padded prefixes to determine a "smaller mask" for each one-padded prefix encountered. As described above, a smaller mask of a one-padded prefix corresponds to the mask of another zero-padded prefix in the padded prefixes. The smaller masks are used, in the described embodiment, in the process of removing duplicates.

The process of FIG. 4(*b*) loops through all the padded prefixes to find a "smaller mask" for each one-padded prefix. Steps 253 and 453 look at a "next" padded prefix, which becomes a "current" padded prefix. Step 454 determines whether the current padded prefix is a one-padded prefix. If so, steps 457 through 460 are performed to determine a smaller mask for the current one-padded prefix. If not, control passes to step 452.

Steps 457 through 460 loop backward from the current one-padded. Step 459 determines, for each padded prefix visited in the backward loop whether the currently visited padded prefix is a) a zero-padded prefix AND b) whether the backwards loop has seen more zero-padded prefixes than one-padded prefixes. If both of the conditions in step 459 are true, the process has found the zero-padded prefix whose mask will become the smaller mask of the current one-padded prefix and whose port will become the port of the current one-padded prefix. In step 460, the mask and port of the currently visited zero-padded prefix are copied to the mask and port of the current one-padded prefix. Thus, the one-padded prefix is assigned its smaller mask (and possibly a new associated port). Control passes to step 452, which searches for a next one-padded prefix.

After step 452 has determined that all prefixes have been looked at, each of the one-padded prefixes has been assigned a smaller mask. For example, as shown in FIG. 5(b), prefix 101111 566 gets the mask and port information of 100000 562 (i.e., a mask of 110000 and a port of Port 3). Similarly, prefix 101111 569 gets the mask and port information of 100000 560 (i.e., a mask of 100000 and a port of Port 2). As described above in connection with step 414, FIG. 4(a), the masks (including smaller masks) are used during the process of eliminating duplicate padded prefixes.

Figure 5A:
FIG. 5(*a*) is an example of non-padded prefixes and their associated ports.

FIG. 4(c) is a flow chart showing steps to apportion the sorted padded prefixes of FIG. 5(c) into memory entries in router database 215 having the format of FIG. 6(a). FIG. 7 shows an example of entries in router database 215 for the prefixes of FIGS. 5(a)–5(c). FIG. 6(a) is an example of a router database format 650 used by the described embodiment. The router database has a number of "entries" or memory areas. Each entry has at most k values, where $2<=k<=N$. Thus, for example, if k=2, the router database will be used in a binary search of the entries. FIG. 6(a) shows a format of one of the values 654. Value 654 includes a padded prefix 656. A corresponding table includes port information 668 associated with the padded prefix, and a pointer, address, or similar reference 667 to another entry (which can also contain a termination value such as null). Each value in each entry in the comparison table preferably has format 654. The memory requirement for the router database is a set of tables of O(N) values in total, where N is a number of padded prefixes, and where each value stores one padded prefix, some associated routing information (e.g., a port number), and an address.

FIG. 4(c) repeats a main loop, dividing the sorted padded prefixes and their associated data into smaller and smaller entries until the number of values in the entries is less than k. The steps of FIG. 4(c) will be described with reference to the example of FIGS. 5(c) and 7. In step 472, a current entry is set to represent the range [1,N], where N is the number of padded prefixes in the router database. Because N=10, the range of this first entry is [1,10]. This range is put on a queue (not shown) in memory 204 (or other appropriate memory).

Step 474 begins a loop in which the next range is obtained from the queue and processed. Processing is completed when there are no more ranges on the queue. An entry is created for each range. As already mentioned, the range in the first pass in the example is [1,10], so a first pass through the loop creates an entry 702 for range [1,10]. Step 475 determines whether (y−x)<k. In the example, y=10; x=1 and k=3. Because (10−1) is not less than 3, control passes to step 476. In step 476, the range [1,10] is divided into entries.

The following example explains how entries are made for the example of FIG. 5(c) and FIG. 7. In the example, for the first pass, x=1, y=10, and k=3. First a value z is determined as follows:

$z=(y-x+1)/k\text{(round down)}=(10-1+1)/3=3.$

Next, the following ranges are placed on the queue.
range1=[x, x+z]=[1, 4]
range2=[x+z, x+2z]=[4, 7]
last range=entry3=[x+(k−1)z, y]=[7,10].

Each of these ranges is put on the queue in step 476 to be processed in a future pass of loop 474. In step 478 of a first pass, an entry 702 (see FIG. 7) having k values is created for the current range (e.g., for [1,10]). In accordance with the format of FIG. 6(a), the first value of the entry 702 for range [1,10] contains a padded prefix, information for the prefix (for example, port information) and a "next entry" address. In the entry 702 for range [1,10], these elements are assigned values as follows:

prefix(x)=prefix(1)=000000
info for prefix(x)=info(1)=Port 1
next entry address=[x, x+z]=address of entry for range[1, 4]

Similarly, the elements of the second value of the entry 702 for range [1,10] contains:

prefix(x+z)=prefix(4)=100101
info for prefix(x+z)=info(4)=Port 4
next entry address=[x+z, x+2z]=address of entry for range [4,7].

Similarly, the kth (i.e., third) value contains:

prefix(x+(k−1)z)=prefix(7)=101111
info for prefix(x+(k−1)z)=info(7)=Port 2
next entry address=[x+(k−1)z, y]=address of entry for range [7,10].

Thus, as shown in FIG. 7, the entry 702 for range [1,10] contains k=3 values, corresponding to padded prefixes number 1, 4, and 7 that point, respectively, to the entries for ranges [1,4], [4,7], and [7,10]. Similarly, the entry 704 for range [1,4] contains k=3 values, corresponding to padded prefixes number 1, 2, and 3 that point, respectively, to the entries for ranges [1,2], [2,3], and [3,4]. Other entries 704, 706, 708 in router database 215 are filled in a similar manner as shown in FIG. 7.

If, in step 475 of FIG. 4(c), a range has k or fewer members, control passes to step 480. Step 480 creates an entry whose values have termination indicators (such as a null value) in the next entry address field. When, for example, the main loop of FIG. 4(c) processes the range [9,10], (10−9)=1 is less than 3, so control passes to step 480.

In the example, for range [9,10], step 480 creates an entry 714 (see FIG. 7) having ((y−x)+1)=(10−9+1)=2 values for the current range [9,10], which contains a first value including:

prefix(x)=prefix(9)=110111
info for prefix(x)=info(9)=Port 2
next entry address=null.

Similarly, a second value of the entry 714 for range [9,10] contains:

prefix(x+z)=prefix(10)=111111
info for prefix(x+z)=info(8)=Port 1
next entry address=null.

Thus, as shown in FIG. 7, the entry 714 for range [9,10] contains two values, corresponding to padded prefixes number 9 and 10 and each containing an associated port number and a termination character. After step 480, control returns to the top of the loop in step 474. Similar entries 710, 712, 716, 718, 720, 722, 724, 726 with termination charters are created as shown in FIG. 7.

After all ranges on the queue have been processed, the entries in router database 215 contain the data needed to perform comparisons for received destination addresses. An example of entries in router database 215 is shown in FIG. 7.

In alternate embodiments, the entry values contain indexes into the sorted padded prefixes instead of copying the actual data into the entry values. This alternate implementation saves space, but involves additional access time to index into the sorted padded prefixes during the comparison operation.

FIG. 6(b) shows a different format that can be used for the router database. In FIG. 6(b), the comparison table has k values in each entry. Each entry includes a padded prefix 606, routing and forwarding information 610, and next address information 612.

FIG. 6(c) shows a different format that can be used for the router database. In FIG. 6(c), the comparison table has k values in each entry. There are two corresponding tables 680 and 690, each, respectively, holding routing and forwarding information 684, and next address information 694.

Figure 6D:
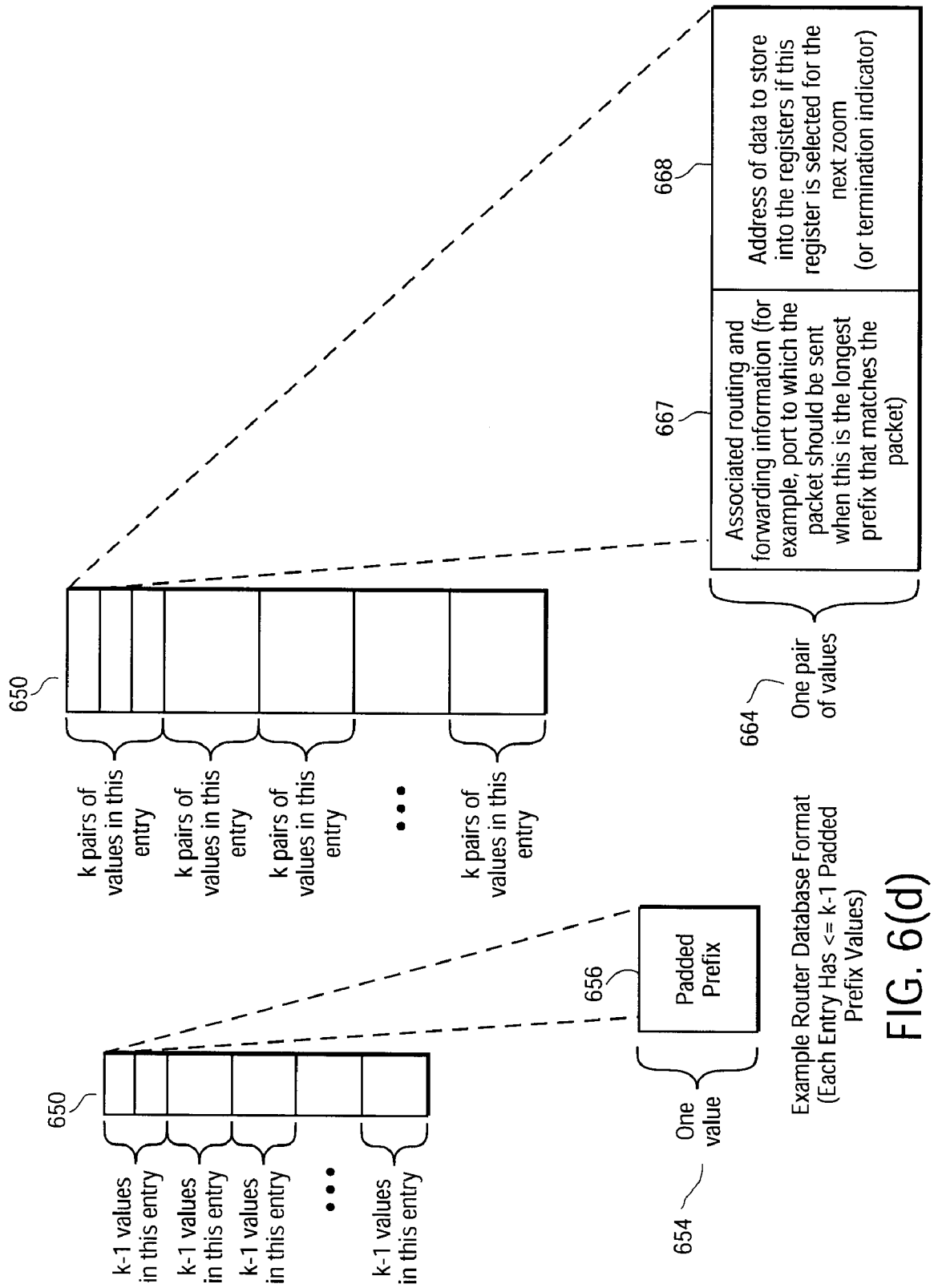
FIGS. 6(*a*)–6(*d*) are exemplary formats of the router database that can be used by the embodiment of FIG. 3.
Figure 7:
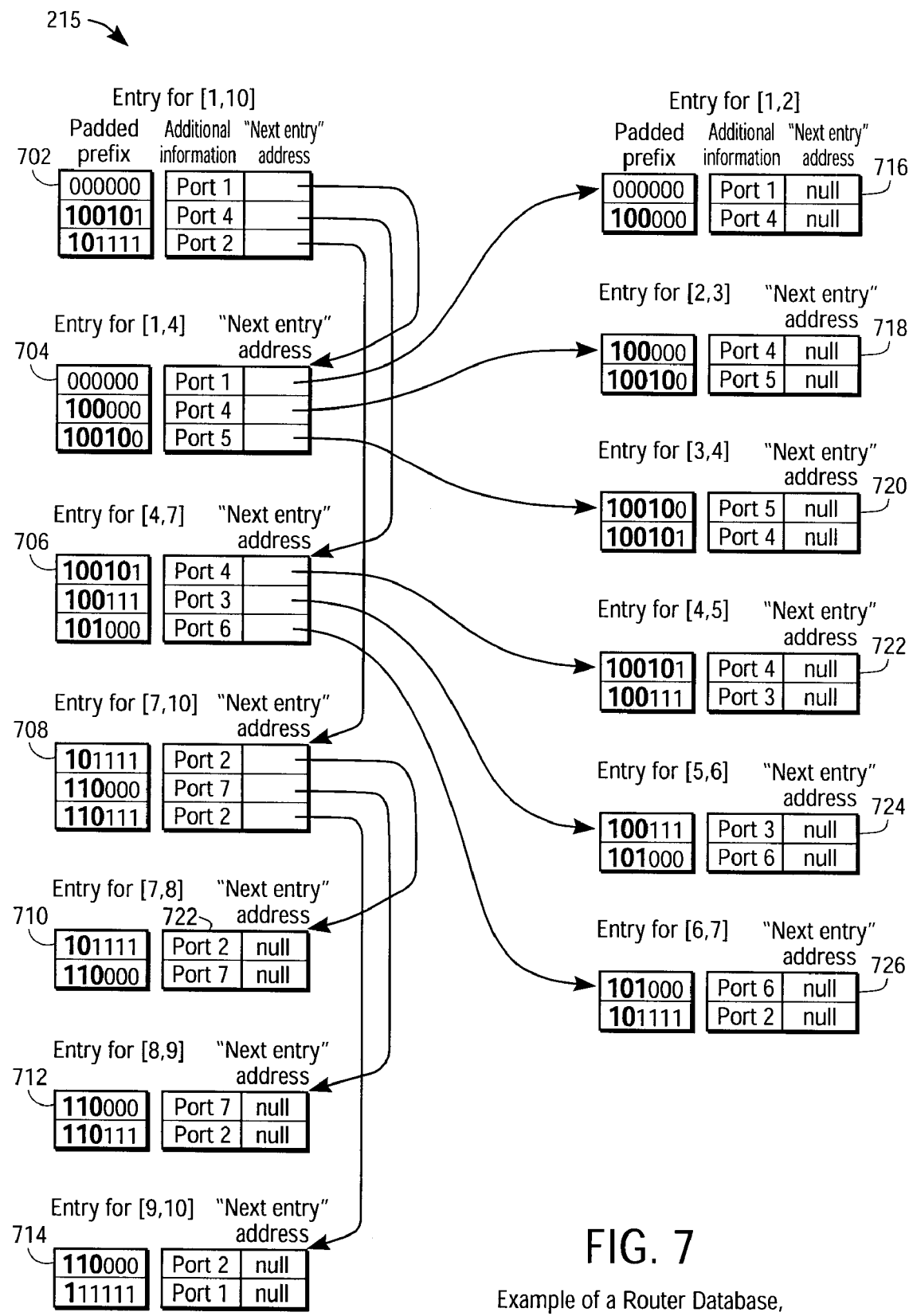
FIG. 7 shows an example of memory entries in the router database for the prefixes of FIG. 5(c) in accordance with the format of FIG. 6(a).

FIG. 6(d) shows a format similar to that of FIG. 6(a), except that each entry in the comparison table has k−1 comparison values, while each entry in the corresponding table has k values.

III. Performing a Comparison Operation

Figure 8A:
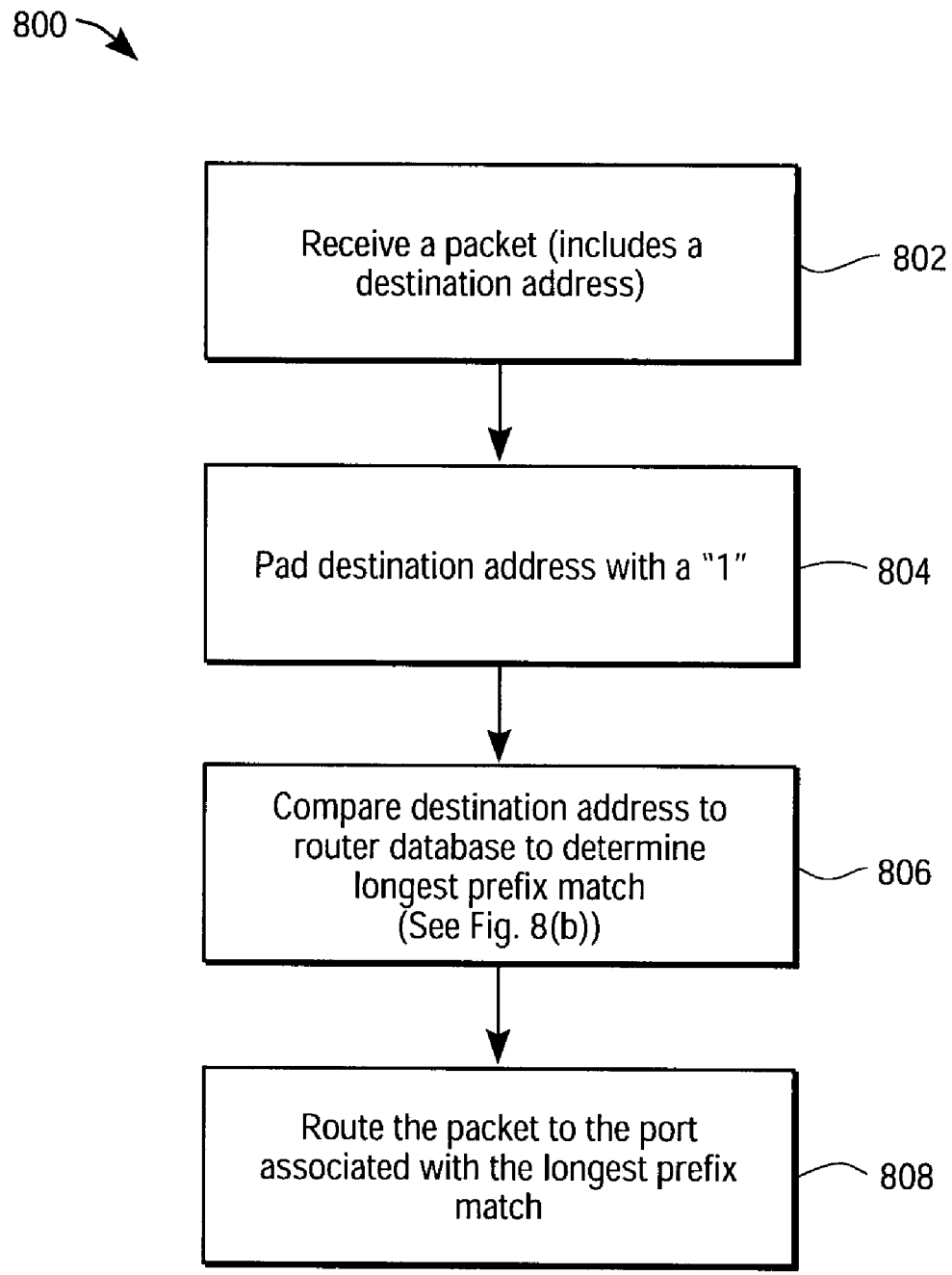
FIG. 8(a) is a flow chart showing details of the steps performed to find a longest prefix match for a received destination address.
Figure 8B:
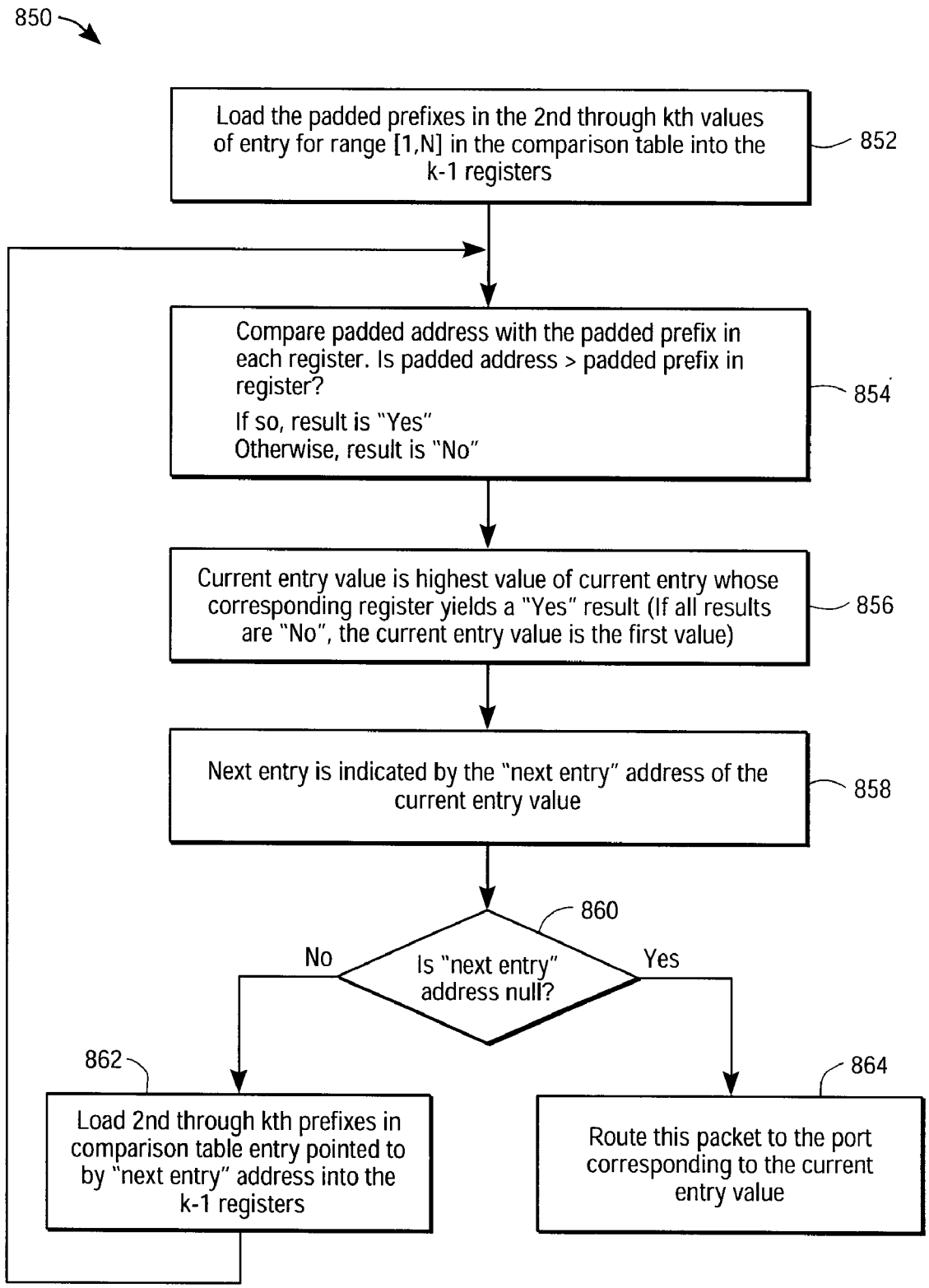
FIG. 8(b) is a flow chart showing additional details of the steps performed to find a longest prefix match for a received destination address.

FIGS. 8 and 9 relate to use of the router database 215 to route packets. Specifically, FIGS. 8(a) and 8(b) are flow charts showing steps performed to find a longest prefix match in router database 215 for a received destination address. The steps of FIG. 8(a) and 8(b) use an entry format of the router database, such as that shown in FIG. 7. The step of FIG. 8(a) and 8(b) require k−1 comparisons 212 between a padded prefix from an entry value and the address. The loop beginning with step 804 of FIG. 8(a) processes each next entry in turn until a null "next entry" address is found. Thus, the single processor implementation of the invention shown in FIG. 2 requires $O(k*\log_k N)$ steps, where N is the number of padded prefixes in router database 215.

Alternately, the entire method of FIGS. 8(a) and 8(b) can be implemented in specialized hardware, using multiple processors or comparators operating in parallel to check the multiple values in an entry. Several such implementations are discussed below in connection with FIGS. 10–16. Such specialized parallel hardware would have substantially the same functionality as described below, but would have the advantage of requiring only $O(\log_k N)$ steps.

In step 802 of FIG. 8(a), the router receives a packet having a destination address. The method uses the destination address of determine to which port to send the packet. In the described embodiment, this destination address is padded with a "1" in step 804. Thus, for example, a destination address of 10000 would be padded to 100001. In step 806, the destination address is compared to the contents of router database 215 to determine a longest prefix the port associated with the longest prefix match. In step 808, the packet is routed to the associated port.

FIG. 8(b) is a flow chart 850 showing more detailed steps of step 806 of FIG. 8(a) to determine a longest prefix match. The steps of FIG. 8(b) are first described with reference to the example of FIGS. 7 and 9(a). In a first pass, in step 852, the second through kth values of an entry 702 for a range [1,N]=[1, 10] are loaded. Step 854 compares the padded destination address 100001 (also called a "target address")

with the k−1 padded prefixes. (Each compared padded prefix is also called a "comparison value.") In the example of FIG. 9(a), the destination address is 10000 (which is padded to 100001). The problem is to find a value j such that:

Padded prefix in entry value(j)<Padded address<=Padded prefix in entry value(j+1), for j=1, 2, 3, k−1. Thus the second, third, fourth, . . . kth values in a current entry are loaded and compared to the padded destination address. The k−1 comparisons can be implemented by k−1 processors or by one processor performing k−1 comparisons, or any variation thereon. In the example, in step 856, the comparison determines, for each entry value 2, . . . , k, whether the padded destination address is greater than the padded prefix. Thus:

processor(j) returns "Yes" if Padded Address>Padded prefix, else return "No".

The process is then continued for the "next entry" of the highest prefix yielding a "Yes" result, as shown in step 858.

As noted above, the k−1 comparisons can be done in parallel (or partly in parallel) in a system containing multiple processors, multiple processing units, multiple comparators, or other appropriate parallel circuitry. This comparison operation can also be implemented using only digital hardware, only analog hardware, or any appropriate combination of analog and digital hardware. Determination of the highest "yes" is performed by a processor or comparator that has access to the result of each of the k−1 comparisons.

Figure 9A:
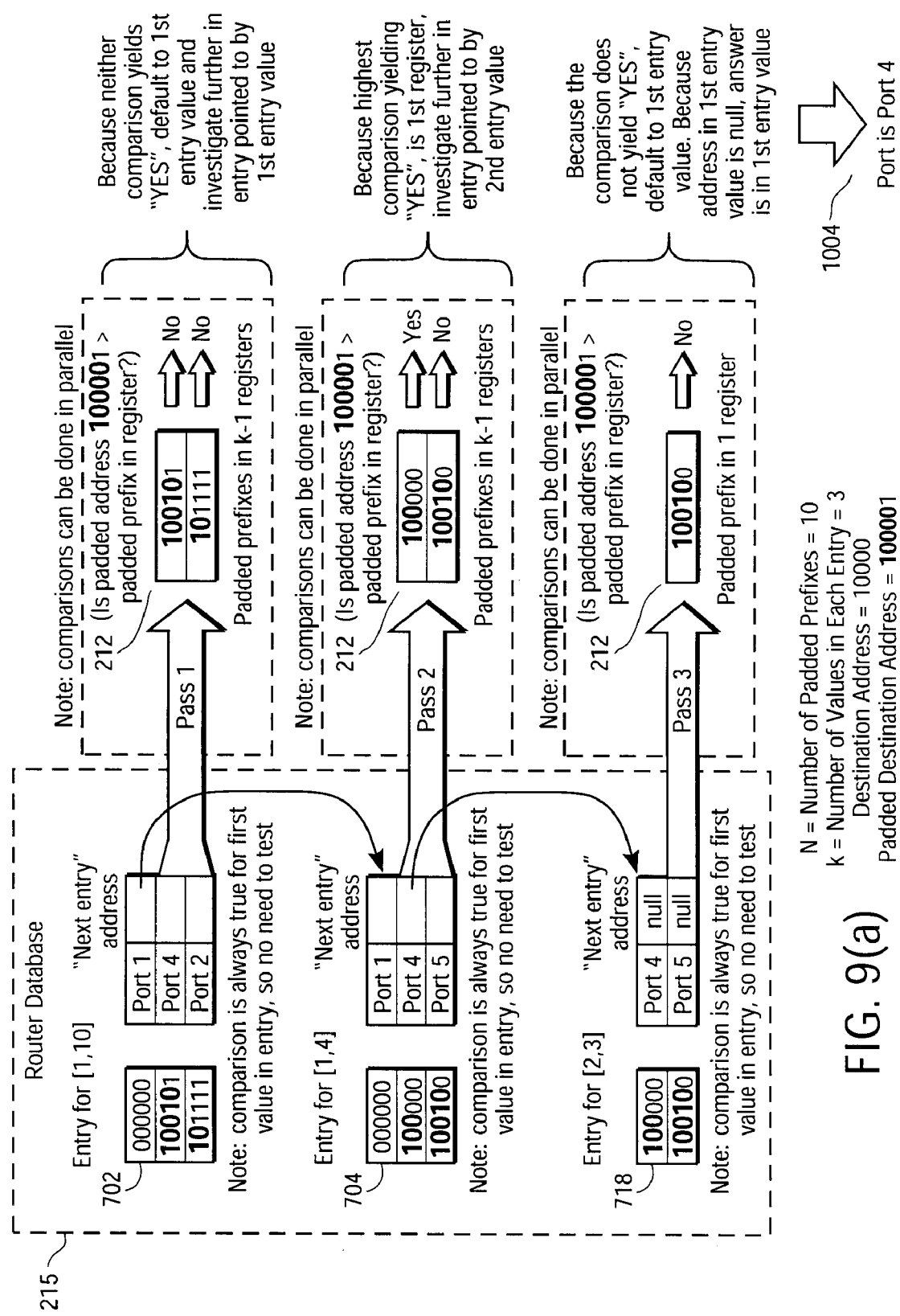
FIG. 9(a) shows an example of a search for a received destination address in the router database of FIG. 7.

Returning to the example, after the first pass of the example of FIG. 9(a), neither comparison yields "Yes", so it is determined that the padded address 100001 falls between the padded prefixes of the first and second entry values.

Thus, j=1 because:

padded prefix(1)<padded address<=padded prefix(2), 000000<100001<=100101, and investigation continues in the entry 704 for the range [1,4], which is pointed to by the "next entry" field of the first value of entry 702.

If, in step 860, the next entry field of value j is null, control passes to step 864. Otherwise, control passes to step 862, which loads the values in the next entry pointed to by the current entry and returns to step 854 to repeat the comparison.

In the example, the next entry address is not null, so the comparison is performed for the entry 704 corresponding to the range [1,4], yielding: padded prefix(2)<padded address<=padded prefix(3), 100000<100001<=100100, and investigation continues in the entry pointed to by the "next entry" field of the second value, which points to the entry 706 for range [2,3]. When the comparison is performed for the entry 706 corresponding to the range [2,3], it yields:

padded prefix(1)<padded address<=padded prefix(2) 100000<100001<=100100.

Because the address for entry 706 are null, step 810 returns the port of the first value of entry 706. This is the port to which the packet is to be routed. In the example, this port is port 4.

To summarize, FIG. 9(a) shows an example of a search for a received address of 10000 in router database 215 of FIG. 7. The destination address is padded with a "1" to 100001. In the example, k=3, all entries have three values or fewer. The method of FIG. 8(b) processes entries until a longest matching prefix with a null "next entry" address is found. In the example of FIG. 9(a), this means that three passes are performed. In pass 1, the values in the second and third values of entry [1,10] 702 are loaded. In pass 2, the values in the second and third values of entry [1, 4] 704 are loaded. In pass 3, the value in the second value of entry [2,3]

718 is loaded. In pass 3, step 864 routes the packet to the port corresponding to the current entry value. Thus, for example, if a received packet has a destination address of 10000, this router will route the packet to Port 4 (refer to FIG. 5(a)).

Figure 9B:
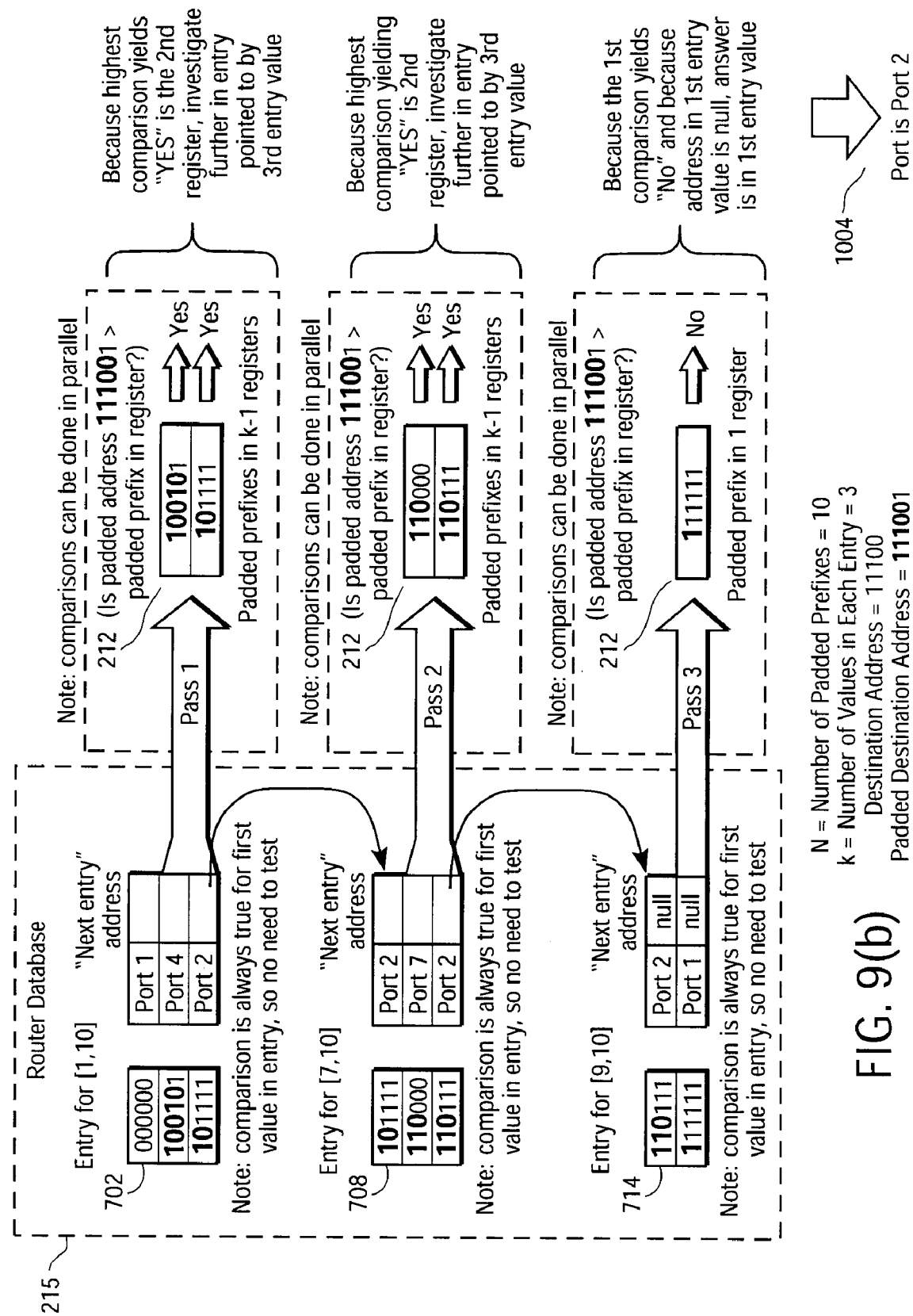
FIG. 9(b) shows an additional example of a search for a received destination address in the router database of FIG. 7.

FIG. 9(b) shows an example of another search for a received destination address of 11100 in router database 215 of FIG. 7. The destination address is padded with a "1" to 111001. In pass 1, k−1 values in entry [1,10] 702 are loaded. In pass 2, k−1 values in entry [7,10] 708 are loaded. In pass 3, one value in entry [9,10] 714 is loaded. In pass 3, step 864 routes this packet to the port corresponding to the current entry value. Thus, as shown in FIG. 5(a), the longest prefix match is 110111 and its associated port is Port 2. Thus, for example, if a received packet has a destination address of 11100, this router will route the packet to Port 2.

IV. Hardware Implementations

FIG. 10 is a block diagram of an embodiment of the present invention implemented in hardware. The embodiment of FIG. 10 loads k padded prefix values (preferably in parallel) and performs k comparisons in parallel between the k padded prefix values and a destination address. (In contrast, the embodiment of FIG. 11 loads k−1 padded prefix values (preferably in parallel) and performs k−1 comparisons in parallel between the k padded prefix values and a destination address.)

FIG. 10 shows a chip or similar circuitry unit 1000 having an on-board storage area 1003 and a functional section 1004. Functional section 1004 contains k registers (or similar memory or circuitry) and circuitry 1050 for parallel comparison between a destination address 1002 and k values in a comparison table entry. The destination address is received on line 1002. Circuitry 1004 addresses storage 1003 via an identification signal on line 1006, such as an address of or a pointer to a next entry in the comparison table. In response, storage 1003 outputs k padded prefix values of the specified entry in parallel over line 1010. These k padded prefix values are loaded into the k registers to allow parallel comparison between the k padded prefix values and the destination address. After a number of passes, the port information for the destination address is output on line 1012. Because the described implementation is contained on a single chip or similar circuitry unit, the comparison operation is not slowed by the limitations of standard computer architectures. One or both of the loading and comparisons of k padded prefix values can be performed in parallel, thus increasing the efficiency of the implementation.

Circuitry 1004 further includes circuitry 1052, which receives an index of a padded prefix that is the best match so far from circuitry 1050. Circuitry 1052 fetches an address of the "next" entry in the comparison table (i.e., the "next" k padded prefixes in the comparison table) in accordance with the index (and in accordance with signal 1006 or a similar signal). This index, along with the signal 1006, indicates a "next" address in the comparison table for the matching padded prefix found by circuitry 1050. This "next" address is returned to circuitry 1052. Circuitry 1052 determines whether the address of the "next" address in the comparison table is null. If not, the "next" address is output as a new signal 1006. Otherwise, the index of the matching padded prefix is also the index of the longest prefix match. In some embodiments (as shown), this index is passed to circuitry 1054, which uses the index to fetch port information for the longest prefix match from storage 1003. Circuitry 1054 receives this port information and outputs it as signal 1012.

FIG. 11 is a block diagram of another embodiment of the present invention implemented in hardware. FIG. 11 is similar to FIG. 10, except that only k−1 padded prefixes are loaded and/or compared in parallel. As discussed above, it is possible to skip comparing the first padded prefix in each comparison table entry and only perform k−1 comparisons with the destination address during each pass. Thus, this first padded prefix does not have to be stored in router database 1003 or loaded into circuitry 1050'. This increases the efficiency of the padded prefix load and compare operations.

FIG. 12 is a block diagram of another embodiment of the present invention implemented in hardware. The embodiment of FIG. 12 loads k padded prefix values in parallel and performs k comparisons in parallel between the k padded prefix values and a destination address. At substantially the same time, circuitry 1252 loads the k "next" addresses and k pieces of port information that correspond to the k padded prefixes. The result of the comparison in circuitry 1250 is then used to select one of the preloaded "next" addresses as signal 1206 (or to select one of the preloaded port numbers as signal 1212).

FIG. 12 shows a chip or similar circuitry unit 1200 having an on-board storage area 1203 and a functional section 1204. Functional section 1204 contains k registers and circuitry 1250 for parallel comparison between a destination address 1202 and k values in a comparison table entry. The destination address is received on line 1202. Circuitry 1204 addresses storage 1203 via an identification signal on line 1206, such as an address of or a pointer to a next entry in the comparison table. In response, storage 1203 outputs k padded prefix values of the specified entry in parallel over line 1210. These k padded prefix values are loaded into the k registers (or similar memory or circuitry) of circuitry 1250 to allow parallel comparison between the k padded prefix values and the destination address. After a number of passes, the port information for the destination address is output on line 1212. Because the implementation is contained on a single chip or similar circuitry unit, the comparison operation is not slowed by the limitations of standard computer architectures. One or both of the loading and comparisons of k padded prefix values can be performed in parallel, thus increasing the efficiency of the implementation.

Circuitry 1204 further includes circuitry 1252, which receives an index of a padded prefix that is the best match so far from circuitry 1250. Circuitry 1252 has previously received k "next" addresses (corresponding to the k padded prefixes) and k port numbers (corresponding to the k padded prefixes). Circuitry 1252 selects a "next" address corresponding to the index from circuitry 1205. If the selected "next" address is not null, the "next" address is output as a new signal 1006 to fetch the next k padded prefixes from an entry in the comparison table. Otherwise (if the "next" address is null), the index from circuitry 1250 is also the index of the longest match prefix. In some embodiments (as shown), circuitry 1252 selects one of the k pieces of port information in accordance with the longest match prefix index from circuitry 1250 and outputs the port information as signal 1212.

FIG. 13 is a block diagram of another embodiment of the present invention implemented in hardware. FIG. 13 is similar to FIG. 12, except that only k−1 padded prefixes are loaded and/or compared in parallel as signal 1210'. Note that k "next" addresses and k pieces of port information as still loaded as signal 1211. As discussed above, it is possible to skip comparing the first padded prefix in each comparison table entry and only perform k−1 comparisons with the destination address in circuitry 1250' during each pass. Thus, this first padded prefix does not have to be stored in router database 1003 or loaded into circuitry 1250'.

Figure 14:
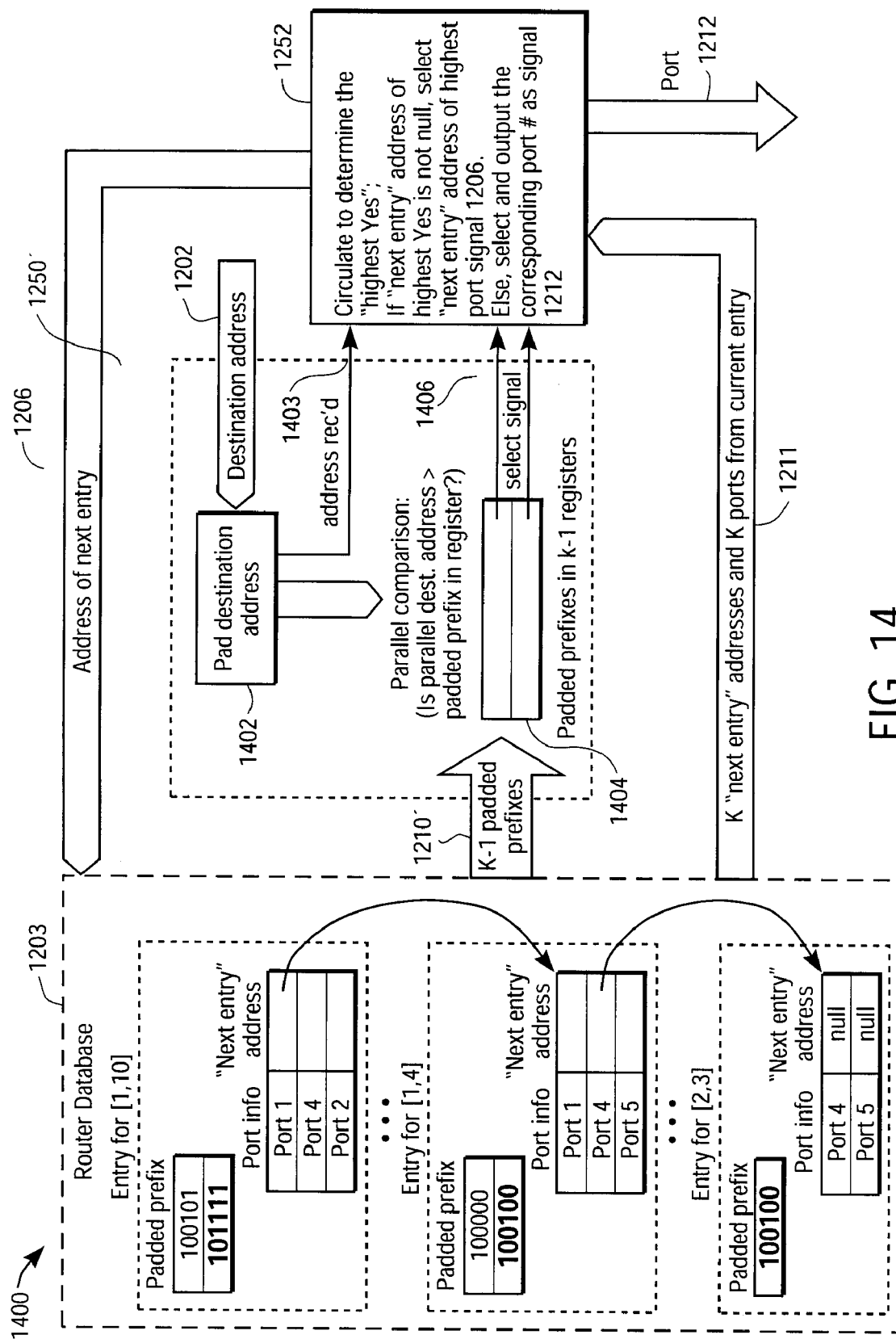
FIG. 14 is a block diagram of additional elements of FIG. 10.

FIG. 14 is a block diagram of additional elements of the system of FIG. 13. The systems of FIGS. 10–13 includes elements similar to circuitry 1250' and 1252. In FIG. 14, the destination address is input on line 1002 and padded with a "1" in element 1402, causing activation of line 1403 which alerts element 1252' that a destination address has been received. In response to activation of line 1403, an initial entry address in the comparison table is sent to storage 1203 on line 1206. K–1 padded prefixes of the initial entry in the comparison table are sent to element 1250' via line 1210'. The k ports and k "next entry" addresses of the k values are sent to element 1252 via line 1211 at substantially the same time. Element 1250 performs the k–1 comparisons between the k–1 padded prefixes sent on line 1210' and the padded destination address. The k–1 comparisons are preferably performed in parallel. Each comparison outputs a "yes or a no" selection signal 1406 (e.g., "0" or "1"). Each of these selection signals 1406 is output to element 1252 as a selection signal.

Element 1252 determines, in accordance with the selection signals, which of the k–1 comparisons yields a highest "yes". If the selected "next entry" address of the highest "yes" is not null, the "next" address signal corresponding to the highest "yes" is sent to storage 1003 on line 1206 as an address of a next comparison table entry to load. If the "next entry" address of the highest "yes" is null, lines 1206 are used as a selector for the k port signals on line 1211. The port corresponding to the highest "yes" is output on line 1212. The port signal on line 1212 is the port to which the incoming packet having the destination address will be routed.

FIG. 15 is a block diagram of another embodiment of the present invention implemented in hardware. FIG. 15 is similar to FIG. 10, except that the single chip or circuitry unit 1004' does not store the entries of the router database 1108 onboard the chip. Instead, storage 1103' is stored on a separate chip or circuitry unit. Thus, in FIG. 15, circuitry 1050 does not have onboard storage. This storage forms a separate chip or circuitry unit.

It will be appreciated that still other hardware implementations of the present invention are possible. FIGS. 10–15 are provided by way of example and not as limitation. For example, the circuit of FIG. 15 could perform only k–1 comparisons, similar to the circuit shown in FIG. 11. As another example, the circuits of FIGS. 12 or 13 could be implemented in more than one chip or circuitry unit, similar to the circuit shown in FIG. 15.

In summary, the present invention provides a fast and efficient way of finding the longest prefix match in a database (such as a router database) for a search key (such as a destination address in a received packet).

While the invention has been described in conjunction with a specific embodiment, it is evident that many alternatives, modifications and variations will be apparent to those skilled in the art in light of the foregoing description. For example, while the described comparison table includes port information, this information can be any application-specific information associated with a search key in the table.

While the described embodiments return a port number or similar port information, other embodiments can also return the actual longest prefix match in addition to or instead of the port. This is accomplished by masking the padded prefix in the "winning" entry value with its associated mask and returning the masked value as the longest prefix match. Accordingly, it is intended to embrace all such alternatives, modifications and variations as fall within the spirit and scope of the appended claims and equivalents.

What is claimed is:

1. A method, performed by a data processing system, of finding a longest match for a piece of target data against a group of comparison values, comprising:

creating a plurality of padded prefixes by padding each prefix for which a router has an associated port both with zeros and with ones to a length one longer than the target data;

sorting the padded prefixes, using masks of the padded prefixes to determine order when there are ties;

eliminating duplicate padded prefixes by keeping a zero-padded duplicate prefix having a longest mask and keeping a one-padded duplicate prefix having a shortest mask;

accessing at least one of a plurality of entries in a comparison data structure, each entry in the data structure having at most k–1 comparison values and k addresses of a next data structure entry, where 2<=k<=N, and where N is the total number of comparison values; and comparing k–1 comparison values in the at least one of the data structure entries to the target data, in parallel, to determine a longest matching value.

2. The method of claim 1, wherein the k–1 comparison values are padded prefixes in the router.

3. The method of claim 1, further including creating the at least one comparison data structure entry, the data structure entry having k–1 comparison values, where each comparison value in the data structure entry additionally includes additional information associated with the comparison value.

4. The method of claim 3, wherein the additional information is port information.

5. The method of claim 1, wherein the comparing further includes:

performing a k–1 way parallel compare between the k–1 comparison values and the target data.

6. The method of claim 1, wherein the target data is a destination address in a data packet received by the router.

7. The method of claim 1, wherein the comparing further includes:

comparing k–1 values of a next entry in the comparison data structure to the target value to yield a longest matching value.

8. The method of claim 1, wherein the comparing further includes:

determining that the address of the next data structure entry for the longest matching value is null and that the longest matching value in the entry data structure is the longest matching value in the group of comparison values.

9. The method of claim 8, further including returning additional data associated with the longest matching value.

10. The method of claim 9, wherein the additional data is a port number.

11. The method of claim 1, further comprising:

creating a one-padded prefix and a zero-padded prefix for each prefix for which the router has an associated port, before the accessing; and determining a "smaller mask" for each of the one-padded prefixes, using a backward loop through the padded prefixes, before the accessing.

12. The method of claim 1, wherein the comparing includes padding the target data with a "1".

13. An apparatus for finding a longest match for a piece of target data against a group of comparison values, comprising:

means for creating a plurality of padded prefixes by padding each prefix for which a router has an associated port both with zeros and with ones to a length one longer than the target data;

means for sorting the padded prefixes, using masks of the padded prefixes to determine order when there are ties;

means for eliminating duplicate padded prefixes by keeping a zero-padded duplicate prefix having a longest mask and keeping a one-padded duplicate prefix having a shortest mask;

means for accessing at least one of a plurality of entries in a comparison data structure, each entry in the data structure having at most k−1 comparison values and k addresses of a next data structure entry, where 2<=k<=N, and where N is the total number of comparison values; and means for comparing k−1 comparison values in the at least one of the data structure entries to the target data, in parallel, to determine a longest matching value.

14. The apparatus of claim 13, further comprising:

means for creating a one-padded prefix and a zero-padded prefix for each prefix for which the router has an associated port, before the accessing step; and means for determining a "smaller mask" for each of the one-padded prefixes, using a backward loop through the padded prefixes.

15. The apparatus of claim 13, wherein the k−1 comparison values are padded prefixes in the router.

16. The apparatus of claim 13, further comprising:

means for creating the at least one comparison data structure entry, the data structure entry having k−1 comparison values, where each comparison value in the data structure entry additionally includes additional information associated with the comparison value.

17. The apparatus of claim 16, wherein the additional information is port information.

18. The apparatus of claim 13, wherein the means for comparing further includes:

means for performing a k−1 way parallel compare between the k−1 comparison values and the target data.

19. The apparatus of claim 13, wherein the target data is a destination address in a data packet received by the router.

20. The apparatus of claim 13, wherein the means for comparing further includes:

means for comparing k−1 values of a next entry in the comparison data structure to the target value to yield a longest matching value.

21. The apparatus of claim 13, wherein the means for comparing further includes:

means for determining that the address of the next data structure entry for the longest matching value is null and that the longest matching value in the entry data structure is the longest matching value in the group of comparison values.

22. The apparatus of claim 21, further comprising:

means for returning additional data associated with the longest matching value.

23. The apparatus of claim 22, wherein the additional data is a port number.

24. A computer program product for finding a longest match for a piece of target data against a group of comparison values, comprising:

computer readable program code devices configured for creating a plurality of padded prefixes by padding each prefix for which a router has an associated port both with zeros and with ones to a length one longer than the target data;

computer readable program code devices configured for sorting the padded prefixes, using masks of the padded prefixes to determine order when there are ties;

computer readable program code devices configured for eliminating duplicate padded prefixes by keeping a zero-padded duplicate prefix having a longest mask and keeping a one-padded duplicate prefix having a shortest mask;

computer readable program code devices configured for accessing at least one of a plurality of entries in a comparison data structure, each entry in the data structure having at most k−1 comparison values and k addresses of a next data structure entry, where 2<=k<=N, and where N is the total number of comparison values; and computer readable program code devices configured for comparing k−1 comparison values in the at least one of the data structure entries to the target data, in parallel, to determine a longest matching value.

25. The computer program product of claim 24, further comprising:

computer readable program code devices configured for creating a one-padded prefix and a zero-padded prefix for each prefix for which the router has an associated port, before the accessing step; and computer readable program code devices configured for determining a "smaller mask" for each of the one-padded prefixes, using a backward loop through the padded prefixes.

26. The computer program product of claim 24, wherein the k−1 comparison values are padded prefixes in the router.

27. The computer program product of claim 24, further comprising:

computer readable computer code devices configured for creating the at least one comparison data structure entry, the data structure entry having k−1 comparison values, where each comparison value in the data structure entry additionally includes additional information associated with the comparison value.

28. The computer program product of claim 27, wherein the additional information is port information.

29. The computer program product of claim 24, wherein the computer readable program code device configured for comparing further includes:

computer readable program code device for performing a k−1 way parallel compare between the k−1 comparison values and the target data.

30. The computer program product of claim 24, wherein the target data is a destination address in a data packet received by the router.

31. The computer program product of claim 24, wherein the computer readable program code device configured for comparing further includes:

computer readable program code device configured for comparing k−1 values of a next entry in the comparison data structure to the target value to yield a longest matching value.

32. The computer program product of claim 24, wherein the computer readable program code device configured for comparing further includes:

computer readable program code device configured for determining that the address of the next data structure entry for the longest matching value is null and that the longest matching value in the entry data structure is the longest matching value in the group of comparison values.

33. The computer program product of claim 32, further comprising:

computer readable program code device configured for returning additional data associated with the longest matching value.

34. The computer program product of claim 33, wherein the additional data is a port number.

35. A computer data signal embodied in a carrier wave and representing sequences of instructions which, when executed by a processor, cause the processor to find a longest match for a piece of target data against a group of comparison values by performing:

creating a plurality of padded prefixes by padding each prefix for which a router has an associated port both with zeros and with ones to a length one longer than the target data;

sorting the padded prefixes, using masks of the padded prefixes to determine order when there are ties;

eliminating duplicate padded prefixes by keeping a zero-padded duplicate prefix having a longest mask and keeping a one-padded duplicate prefix having a shortest mask;

accessing at least one of a plurality of entries in a comparison data structure, each entry in the data structure having at most k−1 comparison values and k addresses of a next data structure entry, where 2<=k<= N, and where N is the total number of comparison values; and comparing k−1 comparison values in the at least one of the data structure entries to the target data, in parallel, to determine a longest matching value.

36. The computer data signal of claim 35, further performing before the accessing:

creating a one-padded prefix and a zero-padded prefix for each prefix for which the router has an associated port, before the accessing step; and determining a "smaller mask" for each of the one-padded prefixes, using a backward loop through the padded prefixes.

37. The computer data signal of claim 36, wherein the k−1 comparison values are padded prefixes in the router.

38. The computer data signal of claim 36, further performing:

creating the at least one comparison data structure entry, the data structure entry having k−1 comparison values, where each comparison value in the data structure entry additionally includes additional information associated with the comparison value.

39. The computer data signal of claim 38, wherein the additional information is port information.

40. The computer data signal of claim 36, wherein the comparing further includes:

performing a k−1 way parallel compare between the k−1 comparison values and the target data.

41. The computer data signal of claim 36, wherein the target data is a destination address in a data packet received by the router.

42. The computer data signal of claim 36, wherein the comparing further includes:

comparing k−1 values of a next entry in the comparison data structure to the target value to yield a longest matching value.

* * * * *